United States Patent
Park et al.

(10) Patent No.: US 11,171,733 B2
(45) Date of Patent: Nov. 9, 2021

(54) METHOD FOR OPERATING TERMINAL IN WIRELESS COMMUNICATION SYSTEM AND DEVICE FOR SUPPORTING SAME

(71) Applicant: LG Electronics Inc., Seoul (KR)

(72) Inventors: Changhwan Park, Seoul (KR); Seokmin Shin, Seoul (KR); Joonkui Ahn, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 16/496,382

(22) PCT Filed: Mar. 22, 2018

(86) PCT No.: PCT/KR2018/003368
§ 371 (c)(1),
(2) Date: Sep. 20, 2019

(87) PCT Pub. No.: WO2018/174600
PCT Pub. Date: Sep. 27, 2018

(65) Prior Publication Data
US 2021/0111824 A1    Apr. 15, 2021

Related U.S. Application Data

(60) Provisional application No. 62/586,188, filed on Nov. 15, 2017, provisional application No. 62/564,286, filed on Sep. 28, 2017, provisional application No. 62/501,103, filed on May 4, 2017, provisional application No. 62/479,293, filed on Mar. 30, 2017, provisional application No. 62/475,151, filed on Mar. 22, 2017.

(51) Int. Cl.
*H04J 11/00* (2006.01)

(52) U.S. Cl.
CPC ....... *H04J 11/0073* (2013.01); *H04J 11/0076* (2013.01)

(58) Field of Classification Search
None
See application file for complete search history.

(56) References Cited

U.S. PATENT DOCUMENTS 10,182,412 B2 *  1/2019  Ko ..................... H04L 5/0053
10,206,189 B2 *  2/2019  Lin .................... H04J 11/0069
(Continued)

FOREIGN PATENT DOCUMENTS

| CN | 102868649 | 1/2013 |
| CN | 106160916 | 11/2016 |

(Continued)

OTHER PUBLICATIONS

Nokia Networks, On the synchronization signal design for NB-IoT, R1-157274, 3GPP TSG-RAN WG1 Meeting #83, Anaheim, USA, Nov. 15-22, 2015, 9 pages.
(Continued)

*Primary Examiner* — Tri H Phan
(74) *Attorney, Agent, or Firm* — Fish & Richardson P.C.

(57) ABSTRACT

The present invention provides a method for a terminal operating by means of utilizing a defined synchronization signal in a wireless communication system supporting narrow band-Internet of Things (NB-IoT), and a device for supporting same.

17 Claims, 27 Drawing Sheets

(56) References Cited

U.S. PATENT DOCUMENTS

| | | | |
|---|---|---|---|
| 10,256,957 B2* | 4/2019 | Park | H04W 72/005 |
| 10,523,353 B2* | 12/2019 | Kim | H04L 27/2613 |
| 10,601,613 B2* | 3/2020 | Chatterjee | H04L 25/022 |
| 10,681,660 B2* | 6/2020 | Ko | H04L 5/0053 |
| 10,805,893 B2* | 10/2020 | Kwon | H04J 11/0076 |
| 10,925,021 B2* | 2/2021 | Shin | H04W 56/001 |
| 10,972,887 B2* | 4/2021 | Park | H04W 4/80 |
| 2016/0066291 A1 | 3/2016 | Awad et al. | |
| 2017/0034798 A1 | 2/2017 | Lin et al. | |
| 2020/0267675 A1* | 8/2020 | Ko | H04W 56/0015 |
| 2020/0314760 A1* | 10/2020 | Ye | H04W 74/006 |

FOREIGN PATENT DOCUMENTS

| | | |
|---|---|---|
| EP | 3340700 | 6/2018 |
| JP | 2016521066 | 7/2016 |
| JP | WO2017033841 | 6/2018 |
| KR | 20140071363 | 6/2014 |
| WO | WO2013022512 | 2/2013 |
| WO | WO2017/018966 | 12/2015 |
| WO | WO2017039739 | 3/2017 |

OTHER PUBLICATIONS

NTT DOCOMO, Inc., "Discussion and evaluation on NR synchronization signal sequence design", R1-1702826, 3GPP TSG RAN WG1 Meeting #88, Athens, Greece, Feb. 13-17, 2017, 8 pages.

PCT International Search Report and Written Opinion in International Application No. PCT/KR2018/003368, dated Jun. 22, 2018, 23 pages.

Qualcomm Incorporated, "Sequence Design for NB-IoT SYNC Channel", R1-157069, 3GPP TSG RAN WG1 #83, Nov. 15-22, 2015, Anaheim, USA, 5 pages.

Chinese Office Action in Chinese Application No. 201880026565.3, dated Jul. 31, 2020, 20 pages (with English translation).

LG Electronics, "Synchronization signal design for NB-IoT," R1-162054, 3GPP TSG RAN WG1 NB-IoT Ad-Hoc Meeting, Sophia Antipolis, France, dated Mar. 22-24, 2016, 8 pages.

CN Notice of Allowance in Chinese Appln. No. 201880026565.3, dated Mar. 1, 2021, 6 pages (with English translation).

WI rapporteur (Ericsson), "RAN1 agreements for Rel-13 NB-IoT," R1-165977, 3GPP TSG-RAN WG1 Meeting #85, Nanjing, China, dated May 22-26, 2016, 33 pages.

EP extended European search report in European Appln. No. 18770860.7, dated Dec. 4, 2020, 10 pages.

JP Office Action in Japanese Appln. No. 2019-552161, dated Dec. 15, 2020, 6 pages (with English translation).

Shimura et al., "Cell ID Detection Probabilities Using Frequency Domain PVS Transmit Diversity for NB-IoT Radio Interface," IEICE Technical Report, The Institute of Electronics, Information and Communication Engineers, vol. 116, No. 39, 7 pages (English abstract only).

Office Action in European Appln. No. 18770860.7, dated Sep. 20, 2021, 6 pages.

\* cited by examiner

METHOD FOR OPERATING TERMINAL IN WIRELESS COMMUNICATION SYSTEM AND DEVICE FOR SUPPORTING SAME

CROSS-REFERENCE TO RELATED APPLICATIONS

This application is a National Stage application under 35 U.S.C. § 371 of International Application No. PCT/KR2018/003368, filed on Mar. 22, 2018, which claims the benefit of U.S. Provisional Application No. 62/586,188, filed on Nov. 15, 2017, U.S. Provisional Application No. 62/564,286, filed on Sep. 28, 2017, U.S. Provisional Application No. 62/501,103, filed on May 4, 2017, U.S. Provisional Application No. 62/479,293, filed on Mar. 30, 2017, and U.S. Provisional Application No. 62/475,151, filed on Mar. 22, 2017. The disclosures of the prior applications are incorporated by reference in their entirety.

TECHNICAL FIELD

The present disclosure relates to a wireless communication system, and more particularly, to a method of operating a user equipment (UE) by using a synchronization signal defined in a wireless communication system supporting narrowband Internet of things (NB-IoT).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, Internet of things (IoT) communication technology is newly proposed. Here, IoT refers to communication that does not involve human interaction. A way to introduce such IoT communication technology in a cellular-based LTE system is further under discussion.

The conventional long term evolution (LTE) system has been designed to support high-speed data communication and thus has been regarded as an expensive communication technology for people.

However, IoT communication technology can be widely used only if the cost is reduced.

There have been discussions about reducing the bandwidth as a way to reduce cost. However, to reduce the bandwidth, a new frame structure should be designed in the time domain, and the issue of interference with the existing neighboring LTE terminals should also be considered.

DISCLOSURE

Technical Problem

An aspect of the present disclosure is to provide a specific operation method of a user equipment (UE) and an apparatus supporting the same, when a synchronization signal defined for narrowband Internet of things (NB-IoT) is used with a modification to the synchronization signal in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for operating a user equipment (UE) in a wireless communication system.

In an aspect of the present disclosure, a method of operating a UE in a wireless communication system includes receiving a new narrowband primary synchronization signal (NPSS) and a new narrowband secondary synchronization signal (NSSS), and performing at least one of cell search, acquisition of information indicating whether paging is transmitted and system information has been updated, or information about a duplex mode applied to the wireless communication system, based on information indicated by at least one of the new NPSS or the new NSSS. The new NPSS is generated by using a Zadoff-Chu sequence different from an NPSS sequence defined in a wireless communication system supporting narrowband Internet of things (NB-IoT), in at least one of a root index or a cover code, and the new NSSS is generated by using a Zadoff-Chu sequence different from an NSSS sequence defined in the wireless communication system supporting NB-IoT, in at least one of a parameter applied to the Zadoff-Chu sequence, a binary sequence applied to the Zadoff-Chu sequence, or a resource mapping method of the Zadoff-Chu sequence.

In another aspect of the present disclosure, a UE operating based on a signal received from a base station in a wireless communication system includes a receiver and a processor operatively coupled to the receiver. The processor is configured to receive a new narrowband primary synchronization signal (NPSS) and a new narrowband secondary synchronization signal (NSSS), and perform at least one of cell search, acquisition of information indicating whether paging is transmitted and system information has been updated, or information about a duplex mode applied to the wireless communication system, based on information indicated by at least one of the new NPSS or the new NSSS. The new NPSS is generated by using a Zadoff-Chu sequence different from an NPSS sequence defined in a wireless communication system supporting narrowband Internet of things (NB-IoT), in at least one of a root index or a cover code, and the new NSSS is generated by using a Zadoff-Chu sequence different from an NSSS sequence defined in the wireless communication system supporting NB-IoT, in at least one of a parameter applied to the Zadoff-Chu sequence, a binary sequence applied to the Zadoff-Chu sequence, or a resource mapping method of the Zadoff-Chu sequence.

The new NPSS and the new NSSS may be received on (or via) an anchor carrier. The new NPSS may be received in a subframe following a subframe carrying the NPSS, and the new NSSS may be received apart from the NSSS by 10 subframes.

Alternatively, the new NPSS and the new NSSS may be received on (or via) an anchor carrier. The new NPSS and the new NSSS may be received alternately, apart from the NSSS by 10 subframes.

Alternatively, the new NPSS and the new NSSS may be received on (or via) a non-anchor carrier. The new NPSS may be received in a first subframe of every radio frame, and the new NSSS may be received in a fifth subframe of at least one of odd-numbered or even-numbered radio frames.

Alternatively, the new NPSS and the new NSSS may be received on a non-anchor carrier. The new NPSS and the new NSSS may be received alternately in a first subframe of every radio frame.

The new NPSS and the new NSSS may not include a narrowband reference signal (NRS).

The UE may perform the cell search by accumulatively detecting the new NPSS and the new NSSS.

When the new NPSS and the new NSSS are used to indicate whether paging is transmitted and system information has been updated, the new NSSS may be repeatedly transmitted in M consecutive subframes after the new NPSS is repeatedly transmitted in N consecutive subframes, the new NPSS is transmitted by applying a different cover code per subframe, and the new NSSS is transmitted by applying at least one of a different cover code per subframe or a different resource mapping method per subframe. Herein, N may be an integer equal to or larger than 0, and M may be a natural number.

When the new NPSS and the new NSSS indicate that system information has been updated, the UE may perform system information update.

Alternatively, the UE may determine the duplex mode applied to the wireless communication system as a time division duplex (TDD) or a frequency division duplex (FDD), based on the root index of the Zadoff-Chu sequence applied to the new NPSS.

The root index of the Zadoff-Chu sequence applied to the new NPSS may be 6.

Alternatively, [1, 1, −1, 1, −1, −1, 1, −1, 1, −1, 1] may be used as the cover code of the Zadoff-Chu sequence applied to the new NPSS.

Alternatively, one of {33/264, 99/264, 165/264, 231/264} may be applied as $\theta_f$ being the parameter applied to the Zadoff-Chu sequence.

Alternatively, the binary sequence, applied to the Zadoff-Chu sequence applied to the new NSSS, is a binary sequence being applied values of columns $16^{th}$, $48^{th}$, $80^{th}$, and $112^{th}$ instead of values of $1^{st}$, $32^{th}$, $64^{th}$, and $128^{th}$ columns of a Hadamard matrix of order 128.

Alternatively, time-first resource mapping may be used as the resource mapping method for the new NSSS.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, the cell search performance of a user equipment (UE) may be increased by a new narrowband primary synchronization signal (NPSS) and a new narrowband secondary synchronization signal (NSSS) configured in similar structures to legacy NPSS and NSSS. Further, the UE may acquire various pieces of information by using the signals and perform various operations based on the acquired information.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present disclosure together with detail explanation. Yet, the technical features of the present disclosure are not limited to a specific drawing. Characteristics disclosed in each of the drawings are combined with each other to configure a new embodiment. Reference numerals in each drawing correspond to structural elements.

BEST MODE FOR CARRYING OUT THE INVENTION

Figure 1:
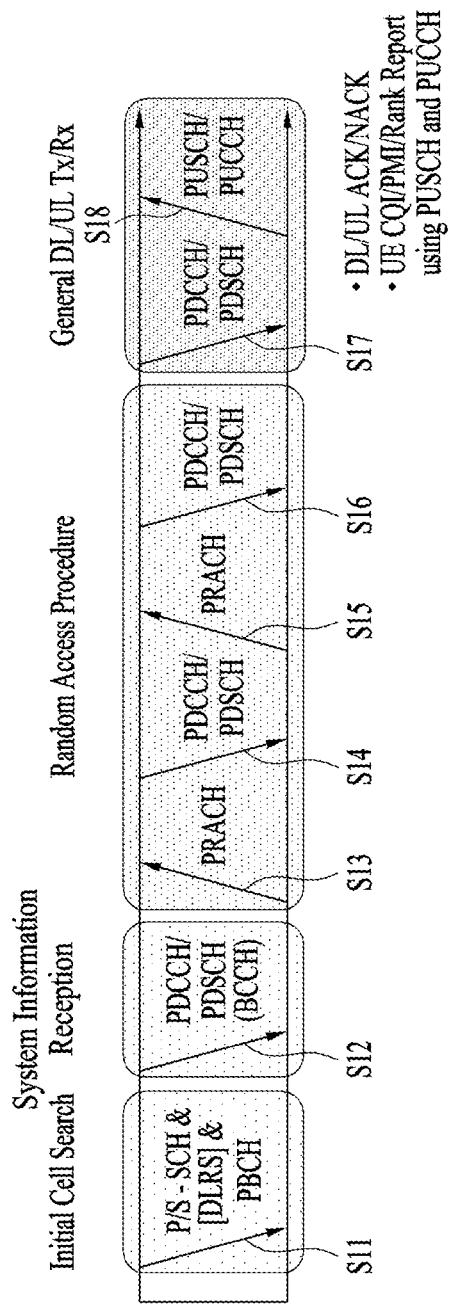
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a $3^{rd}$ generation partnership project (3GPP) system, a 3GPP long term evolution (LTE) system, 3GPP 5G new radio access technology (NR) system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or reserved resource period (RRP) in the same sense. Further, a listen-before-talk (LBT) procedure may be performed for the same purpose as a carrier sensing procedure for determining whether a channel state is idle or busy, clear channel assessment (CCA), and channel access procedure (CAP).

Hereinafter, 3GPP LTE/LTE-A systems are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc. UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a base station. Specifically, the UE synchronizes its timing to the base station and acquires information such as a cell Identifier (ID) by receiving a primary synchronization channel (P-SCH) and a secondary synchronization channel (S-SCH) from the base station.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S12).

To complete connection to the base station, the UE may perform a random access procedure with the base station (S13 to S16). In the random access procedure, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a physical uplink shared channel (PUSCH) and/or a physical uplink control channel (PUCCH) to the base station (S18), in a general UL/DL signal transmission procedure.

Control information that the UE transmits to the base station is generically called uplink control information (UCI). The UCI includes a hybrid automatic repeat request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
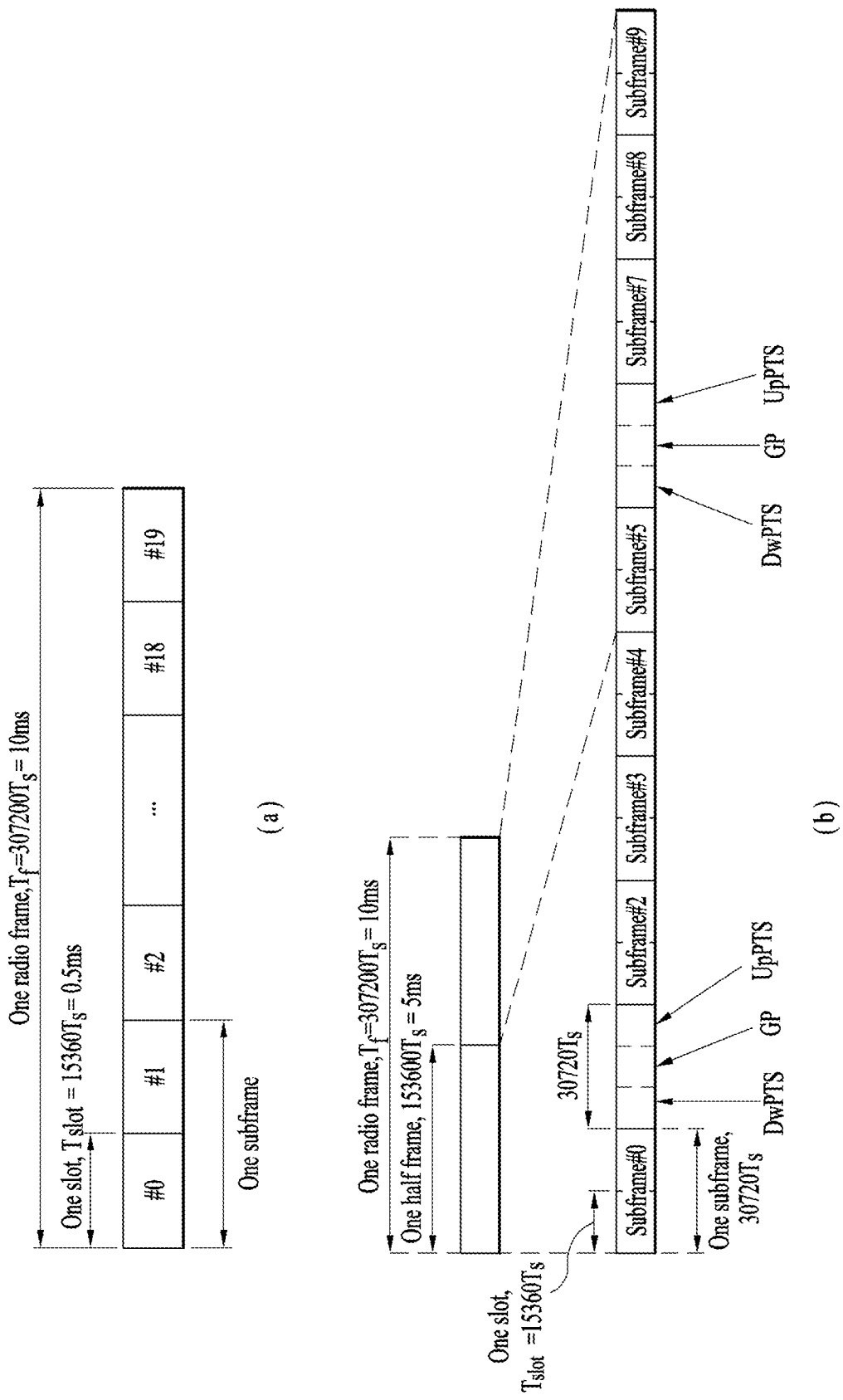
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a transmission time interval (TTI). Ts is a sampling time given as Ts=1/(15 kHz×2048)=3.2552×10-8 (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at a base station. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In addition, in the LTE Rd-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + x) \cdot 2192 \cdot T_s$ | $(1 + x) \cdot 2560 \cdot T_s$ | $7680 \cdot T_s$ | $(1 + x) \cdot 2192 \cdot T_s$ | $(1 + x) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + x) \cdot 2192 \cdot T_s$ | $(2 + x) \cdot 2560 \cdot T_s$ |
| 5 | $6592 \cdot T_s$ | $(2 + x) \cdot 2192 \cdot T_s$ | $(2 + x) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 4:
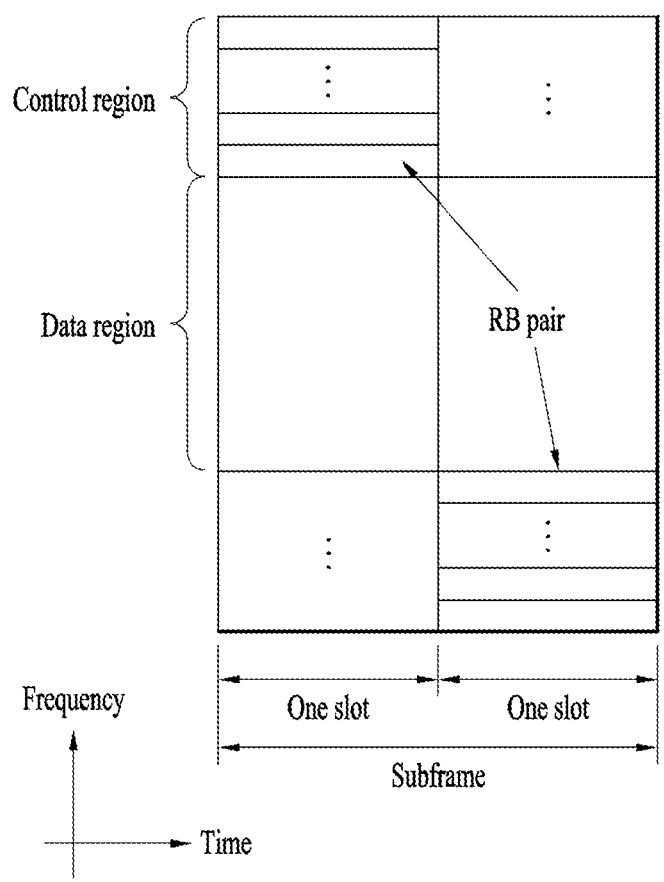
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
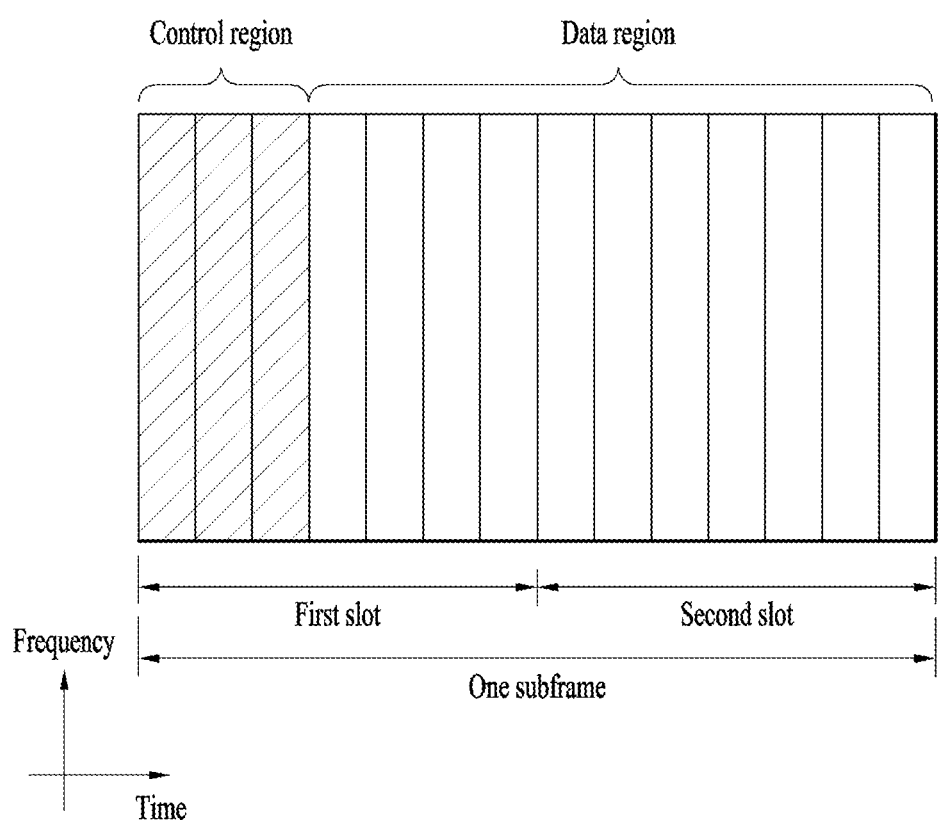
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information FIG. 3 illustrates an exemplary structure of a DL resource grid for the duration of one DL slot, which may be used in embodiments of the present disclosure.

Figure 3:
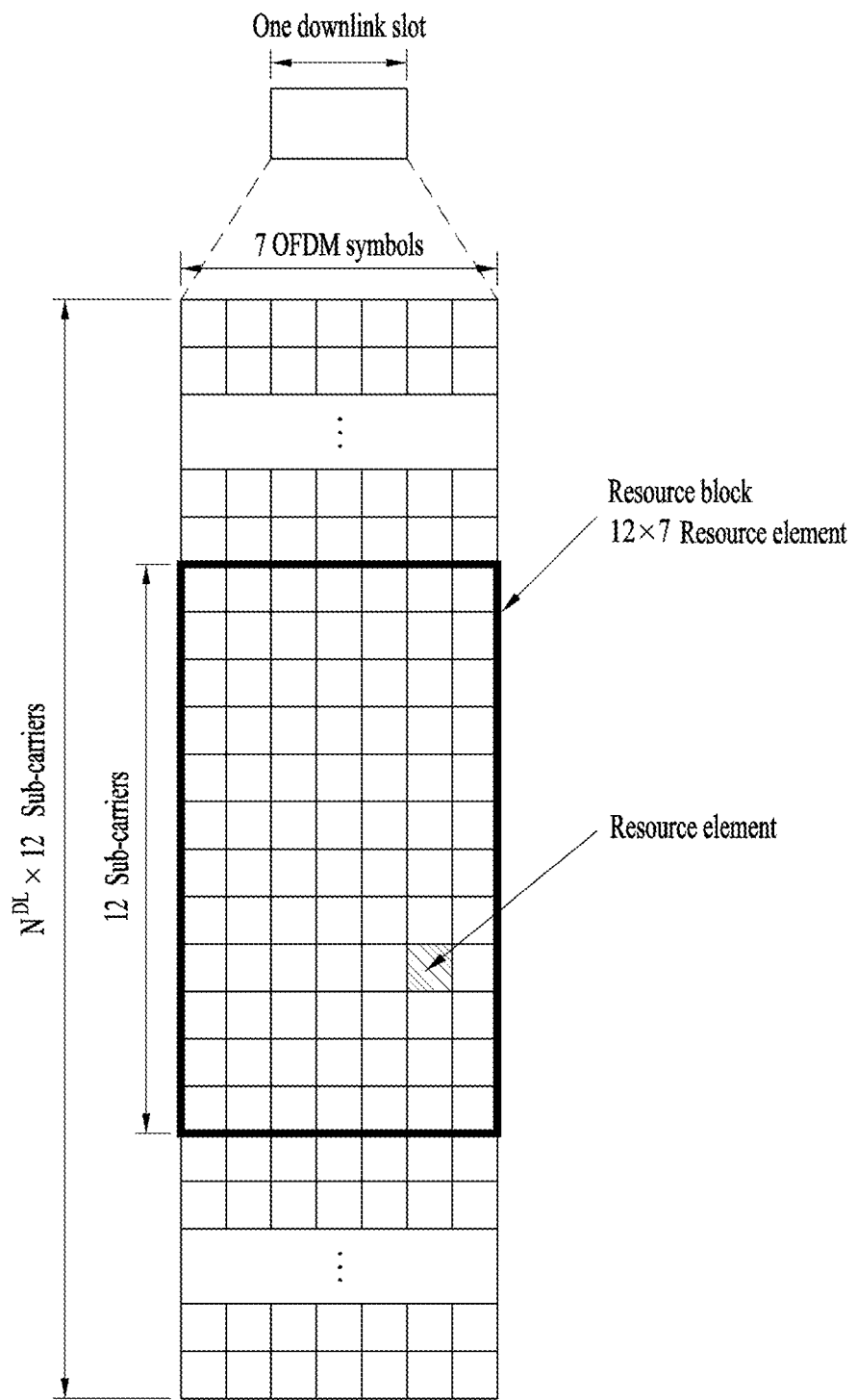
FIG. 3 is a diagram illustrating an exemplary resource grid for the duration of a downlink slot.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a resource element (RE). An RB includes 12×7 REs. The number of RBs in a DL slot, NDL depends on a DL transmission bandwidth.

carried on the PDCCH is called downlink control information (DCI). The DCI transports UL resource assignment information, DL resource assignment information, or UL transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 2 |
| 3 | 14 | 80 | 8 |
| 4 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure can be applied, a self-contained slot structure can be applied based on the above-described slot structure.

Figure 6:
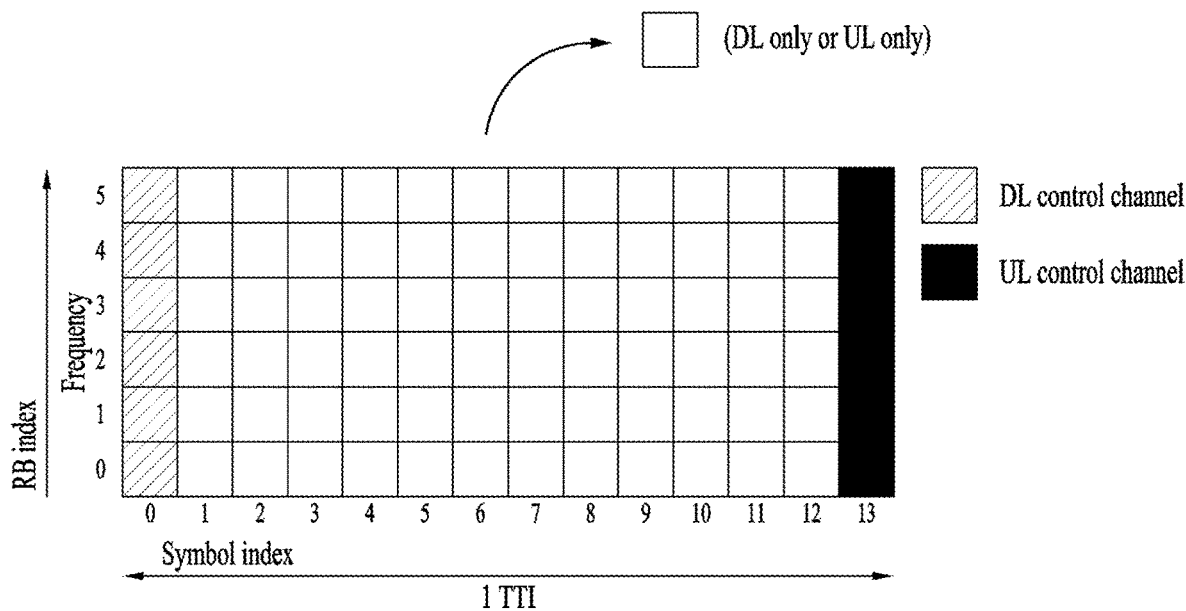
FIG. 6 is a diagram illustrating a self-contained subframe structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the base station and UE can sequentially perform DL transmission and UL transmission in one slot. That is, the base station and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the base station and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing a beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
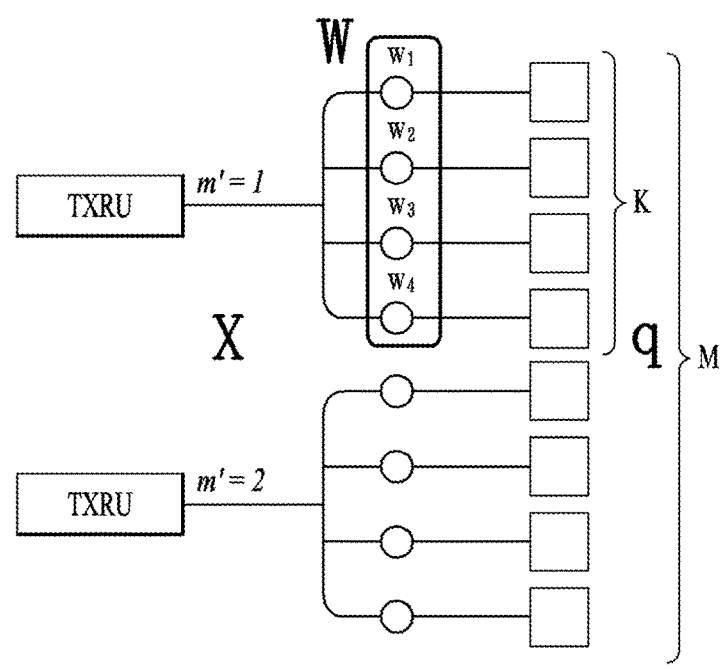
FIGS. 7 and 8 are diagrams illustrating representative methods of connecting transceiver units (TXRUs) to antenna elements.
Figure 8:
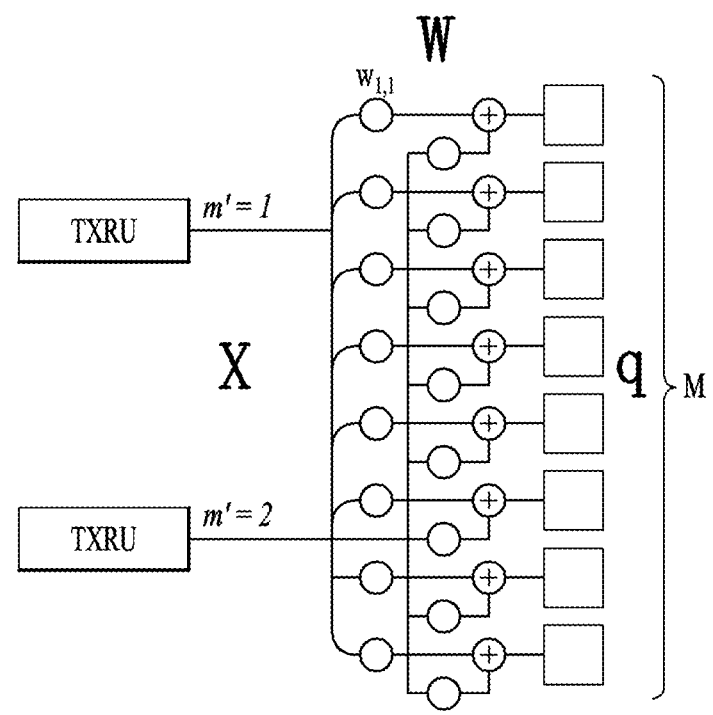

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna elements are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 9:
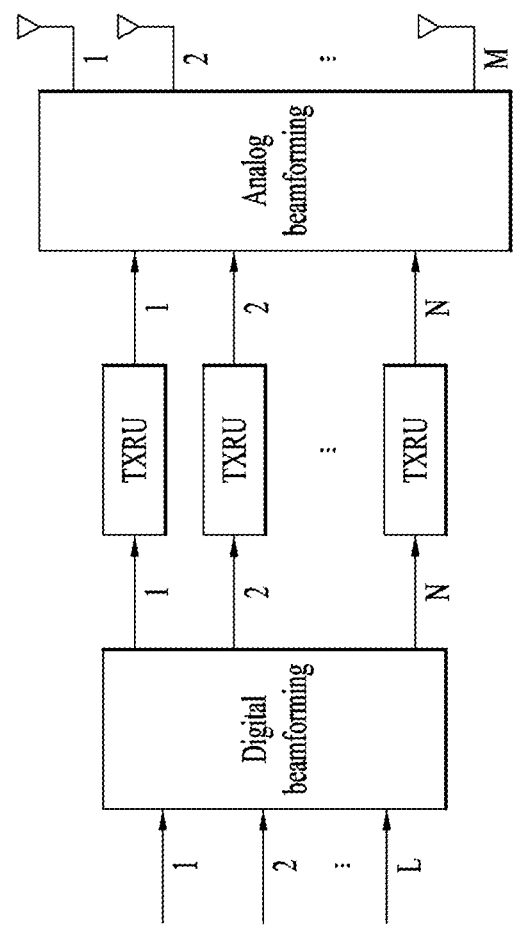
FIG. 9 is a diagram schematically illustrating an exemplary hybrid beamforming structure from the perspective of TXRUs and physical antennas according to the present disclosure.

FIG. 9 is a diagram schematically illustrating an exemplary hybrid BF structure from the perspective of TXRUs and physical antennas according to the present disclosure. In FIG. 9, the number of digital beams is L and the number analog beams is N.

Additionally, in the NR system to which the present disclosure is applicable, a base station designs analog BF to be changed in units of symbols to provide more efficient BF support to a UE located in a specific area. Furthermore, as illustrated in FIG. 9, when N specific TXRUs and M RF antennas are defined as one antenna panel, the NR system according to the present disclosure considers introducing a plurality of antenna panels to which independent hybrid BF is applicable.

In the case in which the base station utilizes a plurality of analog beams as described above, the analog beams advantageous for signal reception may differ according to a UE. Therefore, in the NR system to which the present disclosure is applicable, a beam sweeping operation is being considered in which the base station transmits signals (at least synchronization signals, system information, paging, and the like) by applying different analog beams in a specific subframe (SF) on a symbol-by-symbol basis so that all UEs may have reception opportunities.

Figure 10:
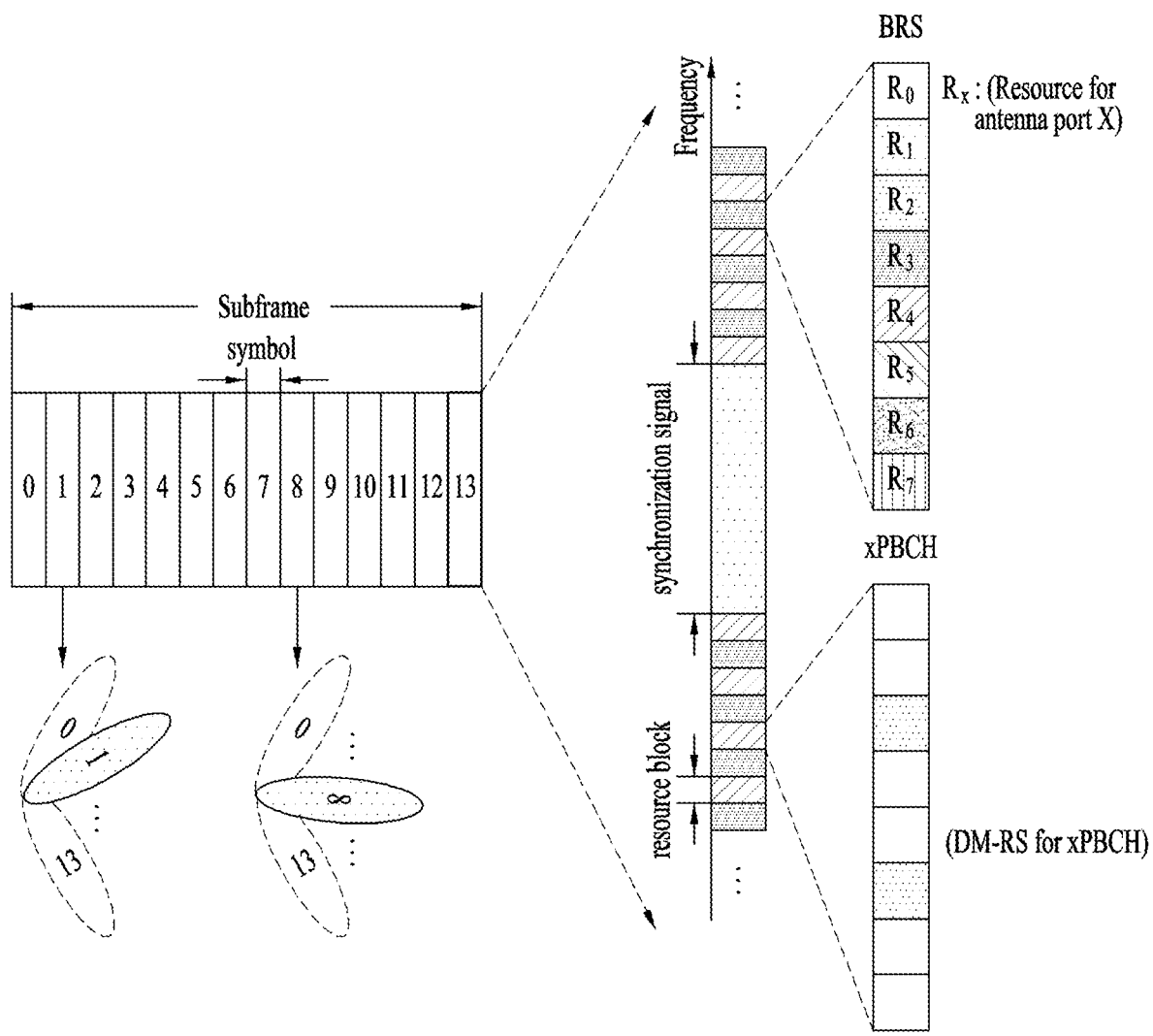
FIG. 10 is a diagram schematically illustrating an exemplary beam sweeping operation for a synchronization signal and system information in a downlink (DL) transmission procedure according to the present disclosure.

FIG. 10 is a diagram schematically illustrating an exemplary beam sweeping operation for a synchronization signal and system information in a DL transmission procedure according to the present disclosure.

In FIG. 10 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 10, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

3. Narrow Band-Internet of Things (NB-IoT)

Hereinafter, the technical features of NB-IoT will be described in detail. While the NB-IoT system based on the 3GPP LTE standard will be mainly described for simplicity, the same configurations are also applicable to the 3GPP NR standard. To this end, some technical configurations may be modified (e.g., subframe→slots)

Although the NB-IoT technology will be described in detail below based on the LTE standard technology, the LTE standard technology can be replaced with the NR standard technology within a range easily derived by those skilled in the art.

3.1. Operation Mode and Frequency

NB-IoT supports three operation modes of in-band, guard band, and stand-alone, and the same requirements apply to each mode.

(1) In the in-band mode, some of the resources in the Long-Term Evolution (LTE) band are allocated to NB-IoT.

(2) In the guard band mode, the guard frequency band of LTE is utilized, and the NB-IoT carrier is disposed as close to the edge subcarrier of the LTE as possible.

In the stand-alone mode, some carriers in the Global System for Mobile Communications (GSM) band are separately allocated and operated.

An NB-IoT UE searches for an anchor carrier in units of 100 kHz for initial synchronization, and the anchor carrier center frequency of the in-band and the guard band should be within ±7.5 kHz from a channel raster of 100 kHz channel. In addition, among the LTE PRBs, 6 middle PRBs are not allocated to NB-IoT. Therefore, the anchor carrier may only be positioned on a specific Physical Resource Block (PRB).

Figure 11:
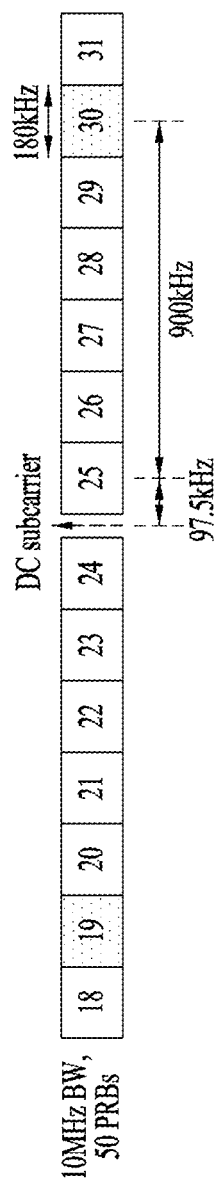
FIG. 11 is a diagram schematically illustrating arrangement of an in-band anchor carrier for a long term evolution (LTE) bandwidth of 10 MHz.

FIG. 11 is a diagram schematically illustrating arrangement of an in-band anchor carrier for an LTE bandwidth of 10 MHz.

As shown in FIG. 11, a direct current (DC) subcarrier is positioned at a channel raster. Since the center frequency interval between adjacent PRBs is 180 kHz, PRB indexes 4, 9, 14, 19, 30, 35, 40 and 45 have center frequencies at ±2.5 kH from the channel raster.

Similarly, the center frequency of a PRB suitable for anchor carrier transmission is positioned at ±2.5 kHz from the channel raster in the case of a bandwidth of 20 MHz, and is positioned at ±7.5 kHz for bandwidths of 3 MHz, 5 MHz and 15 MHz.

In the guard band mode, the PRB immediately adjacent to the edge PRB of LTE is positioned at ±2.5 kHz from the channel raster in the case of the bandwidths of 10 MHz and 20 MHz. In the case of 3 MHz, 5 MHz, and 15 MHz, the center frequency of the anchor carrier may be positioned at ±7.5 kHz from the channel raster by using the guard frequency band corresponding to the three subcarriers from the edge PRB.

The stand-alone mode anchor carriers are aligned with a 100-kHz channel raster, and all GSM carriers, including DC carriers, may be used as NB-IoT anchor carriers.

In addition, the NB-IoT supports operation of multiple carriers, and combinations of in-band+in-band, in-band+guard band, guard band+guard band, and stand-alone+stand-alone may be used.

3.2. Physical Channel 3.2.1. Downlink (DL)

For the NB-IoT downlink, an Orthogonal Frequency Division Multiple Access (OFDMA) scheme with a 15 kHz subcarrier spacing is employed. This scheme provides orthogonality between subcarriers to facilitate coexistence with LTE systems.

On the downlink, physical channels such as a narrowband physical broadcast channel (NPBCH), a narrowband physical downlink shared channel (NPDSCH), and a narrowband physical downlink control channel (NPDCCH) are provided, and a narrowband primary synchronization signal (NPSS), a narrowband primary synchronization signal (NSSS) and a narrowband reference signal (NRS) are provided as physical signals.

Figure 12:
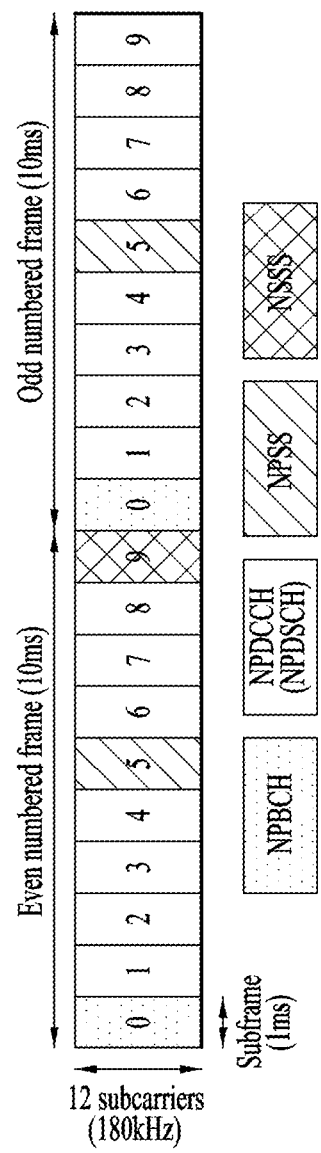
FIG. 12 is a diagram schematically illustrating positions where a physical DL channel and a DL signal are transmitted in a frequency division duplex (FDD) LTE system.

FIG. 12 is a diagram schematically illustrating positions where a physical downlink channel and a downlink signal are transmitted in an FDD LTE system.

As shown in FIG. 12, the NPBCH is transmitted in the first subframe of each frame, the NPSS is transmitted in the sixth subframe of each frame, and the NSSS is transmitted in the last subframe of each even-numbered frame.

The NB-IoT UE should acquire system information about a cell in order to access a network. To this end, synchronization with the cell should be obtained through a cell search procedure, and synchronization signals (NPSS, NSSS) are transmitted on the downlink for this purpose.

The NB-IoT UE acquires frequency, symbol, and frame synchronization using the synchronization signals and searches for 504 physical cell IDs (PCIDs). The LTE synchronization signal is designed to be transmitted over 6 PRB resources and is not reusable for NB-IoT, which uses 1 PRB.

Thus, a new NB-IoT synchronization signal has been designed and is to the three operation modes of NB-IoT in the same manner.

More specifically, the NPSS, which is a synchronization signal in the NB-IoT system, is composed of a Zadoff-Chu (ZC) sequence having a sequence length of 11 and a root index value of 5.

Here, the NPSS may be generated according to the following equation.

$$d_l(n) = S(l) \cdot e^{-j\frac{\pi u n(n+1)}{11}}, n = 0, 1, \ldots, 10 \quad \text{[Equation 1]}$$

Here, S(l) for symbol index l may be defined as shown in the following table.

TABLE 6

| Cyclic prefix length | S(3),..., S(13) |
|---|---|
| Normal | 1  1  1  1  −1  −1  1  1  1  −1  1 |

The NSSS, which is a synchronization signal in the NB-IoT system, is composed of a combination of a ZC sequence having a sequence length of 131 and a binary scrambling sequence such as a Hadamard sequence. In particular, the NSSS indicates a PCID to the NB-IoT UEs in the cell through the combination of the sequences.

Here, the NSSS may be generated according to the following equation.

$$d(n) = b_q(m) e^{-j2\pi\theta_f n} e^{-j\frac{\pi u n'(n'+1)}{131}} \quad \text{[Equation 2]}$$

Here, the parameters in Equation 2 may be defined as follows.

TABLE 7 n = 0, 1, . . . , 131
n' = n mod 131
m = n mod 128
u = $N_{ID}^{Ncell}$ mod 126 + 3

$$q = \left\lfloor \frac{N_{ID}^{Ncell}}{126} \right\rfloor$$

The binary sequence $b_q(m)$ may be defined as shown in the following table, and the cyclic shift $\theta_f$ for the frame number of may be defined by the equation given below.

TABLE 8

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 -1 1 1 -1 -1 1 1 -1 1 -1 -1 1 -1 1 1 -1 1 -1 -1 1 1 1<br>-1 -1 1 -1 1 1 1 -1 1 1 -1 -1 1 1 -1 1 1 -1 -1 1 1 -1 1 -1 -1 1 1 -1 1<br>1 -1 1 1 -1 -1 1 1 1 -1 1 -1 -1 1 1 -1 1 1 -1 -1 1 1 1 -1 1 -1 1 1 1<br>-1 1 -1 -1 1 1 -1 1 1 1 -1 -1 1 1 1 -1 -1 1 1 1 -1 1 1 1 -1 1 -1 -1 1<br>-1 1 1 1 -1 -1 1 1 1 -1 1 -1 -1 1 1 -1 1 1 -1 1 -1 1 1 1 -1 -1 1 -1<br>1 1 -1] |
| 2 | [1 -1 -1 1 -1 1 1 1 -1 -1 1 1 1 -1 1 -1 -1 1 1 -1 1 1 -1 -1 1 1 1<br>-1 -1 1 -1 1 1 1 -1 1 1 1 -1 1 -1 -1 1 1 1 -1 1 1 -1 -1 1 1 1 -1 1<br>-1 1 -1 1 1 1 -1 1 1 1 -1 1 -1 -1 1 1 1 -1 1 1 -1 -1 1 1 1<br>-1 1 -1 -1 1 -1 1 1 1 -1 1 -1 -1 1 1 1 -1 1 -1 1 1 1 -1 -1 1 1 1 -1 1<br>1 -1 -1 1 1 1 -1 1 1 -1 1 -1 -1 1 1 -1 1 -1 1 1 1 -1 -1 1 1 1 -1 1<br>-1 -1 1 1] |
| 3 | [1 -1 -1 1 -1 1 1 1 -1 -1 1 1 1 -1 1 -1 -1 1 1 1 -1 1 -1 -1 1 1 1<br>-1 -1 1 -1 1 1 1 -1 1 1 1 -1 1 -1 -1 1 1 1 -1 1 1 -1 -1 1 1 1 -1 1<br>-1 1 -1 1 1 1 -1 1 1 1 -1 1 -1 -1 1 1 1 -1 1 -1 1 1 1 -1 -1 1<br>1 -1 1 1 1 -1 1 -1 -1 1 1 1 1 -1 -1 1 1 1 -1 1 -1 -1 1 1 1 -1 -1 1 1<br>-1 1 1 1 -1 -1 1 1 1 -1 1 -1 -1 1 -1 1 1 1 -1 1 -1 1 1 1 -1 -1 1 1 -1 -1<br>1 1 -1] |

$$\theta_f = \frac{33}{132}(n_f/2) \bmod 4 \qquad \text{[Equation 3]}$$

A narrowband reference signal (NRS) is provided as a reference signal for channel estimation necessary for physical downlink channel demodulation and is generated in the same manner as in LTE. However, NBNarrowband-Physical Cell ID (PCID) is used as the initial value for initialization.

The NRS is transmitted to one or two antenna ports, and up to two base station transmit antennas of NB-IoT are supported.

The NPBCH carries the Master Information Block-Narrowband (MIB-NB), which is the minimum system information that the NB-IoT UE should know to access the system, to the UE.

The transport block size (TBS) of the MIB-NB, which is 34 bits, is updated and transmitted with a periodicity of transmission time interval (TTIs) of 640 ms, and includes information such as the operation mode, the system frame number (SFN), the hyper-SFN, the cell-specific reference signal (CRS) port number, and the channel raster offset.

The NPBCH signal may be repeatedly transmitted 8 times in total to improve coverage.

The NPDCCH has the same transmit antenna configuration as the NPBCH, and supports three types of downlink control information (DCI) formats. DCI N0 is used to transmit the scheduling information of the narrowband physical uplink shared channel (NPUSCH) to the UE, and DCIs N1 and N2 are used in transmitting information required for demodulation of the NPDSCH to the UE. Transmission of the NPDCCH may be repeated up to 2048 times to improve coverage.

The NPDSCH is a physical channel for transmission of a transport channel (TrCH) such as the downlink-shared channel (DL-SCH) or the paging channel (PCH). The maximum TBS is 680 bits and transmission may be repeated up to 2048 times to improve coverage.

3.2.2. Uplink (UL)

The uplink physical channels include a narrowband physical random access channel (NPRACH) and the NPUSCH, and support single-tone transmission and multi-tone transmission.

Multi-tone transmission is only supported for subcarrier spacing of 15 kHz, and single-tone transmission is supported for subcarrier spacings of 3.5 kHz and 15 kHz.

On the uplink, the 15-Hz subcarrier spacing may maintain the orthogonality with the LTE, thereby providing the optimum performance. However, the 3.75-kHz subcarrier spacing may degrade the orthogonality, resulting in performance degradation due to interference.

The NPRACH preamble consists of four symbol groups, wherein each of the symbol groups consists of a cyclic prefix (CP) and five symbols. The NPRACH only supports single-tone transmission with 3.75-kHz subcarrier spacing and provides CPs having lengths of 66.7 μs and 266.67 μs to support different cell radii. Each symbol group performs frequency hopping and the hopping pattern is as follows.

The subcarrier for transmitting the first symbol group is determined in a pseudo-random manner. The second symbol group hops by one subcarrier, the third symbol group hops by six subcarriers, and the fourth symbol group hops by one subcarrier hop.

In the case of repeated transmission, the frequency hopping procedure is repeatedly applied. In order to improve the coverage, the NPRACH preamble may be repeatedly transmitted up to 128 times.

The NPUSCH supports two formats. Format 1 is for UL-SCH transmission, and the maximum transmission block size (TBS) thereof is 1000 bits. Format 2 is used for transmission of uplink control information such as HARQ ACK signaling. Format 1 supports single-tone transmission and multi-tone transmission, and Format 2 supports only single-tone transmission. In single-tone transmission, p/2-binary phase shift keying (BPSK) and p/4-QPSK (quadrature phase shift keying) are used to reduce the peat-to-average power ratio (PAPR).

3.2.3. Resource Mapping

In the stand-alone and guard band modes, all resources included in 1 PRB may be allocated to the NB-IoT. However, in the in-band mode, resource mapping is limited in order to maintain orthogonality with the existing LTE signals.

The NB-IoT UE should detect NPSS and NSSS for initial synchronization in the absence of system information. Accordingly, resources (OFDM symbols 0 to 2 in each subframe) classified as the LTE control channel allocation region cannot be allocated to the NPSS and NSSS, and NPSS and NSSS symbols mapped to a resource element (RE) overlapping with the LTE CRS should be punctured.

Figure 13:
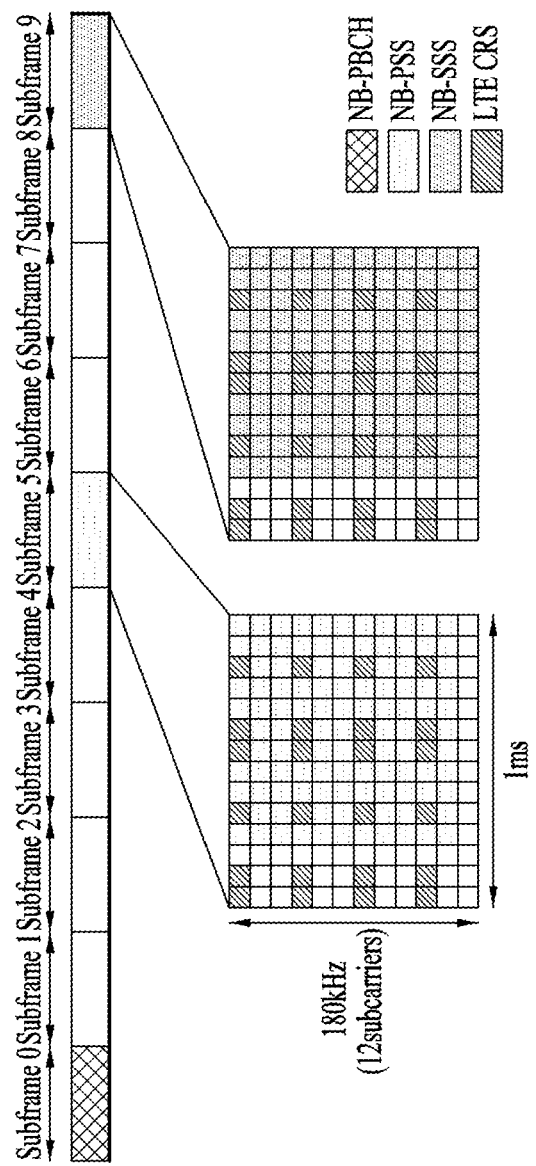
FIG. 13 is a diagram illustrating exemplary resource allocation for a narrowband Internet of things (NB-IoT) signal and an LTE signal in an in-band mode.

FIG. 13 is a diagram illustrating exemplary resource allocation of an NB-IoT signal and an LTE signal in an in-band mode.

As shown in FIG. 13, for ease of implementation, the NPSS and NSSS are not transmitted on the first three OFDM symbols in the subframe corresponding to the transmission resource region for the control channel in the conventional LTE system regardless of the operation mode. REs for the common reference signal (CRS) in the conventional LTE system and the NPSS/NSSS colliding on a physical resource are punctured and mapped so as not to affect the conventional LTE system.

After the cell search, the NB-IoT UE demodulates the NPBCH in the absence of system information other than the PCID. Therefore, the NPBCH symbol cannot be mapped to the LTE control channel allocation region. Since four LTE antenna ports and two NB-IoT antenna ports should be assumed, the REs allocated to the CRS and NRS cannot be allocated to the NPBCH. Therefore, the NPBCH should be rate-matched according to the given available resources.

After demodulating the NPBCH, the NB-IoT UE may acquire information about the CRS antenna port number, but still may not know the information about the LTE control channel allocation region. Therefore, NPDSCH for transmitting System Information Block type 1 (SIB1) data is not mapped to resources classified as the LTE control channel allocation region.

However, unlike the case of the NPBCH, an RE not allocated to the LTE CRS may be allocated to the NPDSCH. Since the NB-IoT UE has acquired all the information related to resource mapping after receiving SIB1, the NPDSCH (except for the case where SIB1 is transmitted) and the NPDCCH may be mapped to available resources based on the LTE control channel information and the CRS antenna port number.

4. Proposed Embodiment

Now, a detailed description will be given of configurations proposed by the present disclosure based on the above technical ideas.

An NB-IoT UE may support both normal coverage corresponding to coverage of a UE in another wireless communication system (e.g., LTE) and extended coverage wider than the normal coverage. The normal coverage and the extended coverage may correspond to −6 dB and −12 dB in terms of signal-to-noise ratio (SNR), respectively, and the requirements may be defined in 3GPP TS 36.133 "Requirements for support of radio resource management" or the like.

Cell search of an NB-IoT UE may take much time in extended coverage to satisfy a specific reliability (e.g., 90%). Therefore, a method of improving the cell search performance of NB-IoT may be applied to LTE and NR systems beyond Rel-15 to which the present disclosure is applicable. The cell search performance may be improved through an advanced receiver of a UE or through additional transmission of a synchronization signal or a channel.

As a method of transmitting an additional synchronization signal or an additional channel to improve the cell search performance of an NB-IoT UE, a new NPSS and a new NSSS according to the present disclosure will be described below in detail.

For the convenience of description, the new NPSS and new NSSS are referred to as additional NPSS (aNPSS) and additional NSSS (aNSSS), respectively in order to distinguish NPSS and NSSS defined in the NB-IoT system from the new NPSS and new NSSS proposed in the present disclosure.

A base station may transmit an aNPSS and an aNSSS all the time or only when configuration information about an aNPSS and an aNSSS of a serving cell or a target cell for measurement is allocated.

Particularly, the aNPSS and the aNSSS need to be designed in a manner that minimizes performance degradation in a cell search procedure of a legacy UE (e.g., an NB-IoT UE supported by a system prior to Rel. 15), even when the base station transmits the aNPSS and the aNSSS only during a specific time period. In this context, an aNPSS and an aNSSS in which the above requirement is considered according to the present disclosure will be described in detail.

First, an NB-IoT UE performs a cell search procedure using an NPSS and an NSSS in the following order.

In order to detect an anchor carrier during frequency scanning, the NB-IoT UE attempts to detect an NPSS in a frequency band of 180 kHz in an arbitrary carrier frequency matching an NB-IoT channel raster condition.

The NB-IoT UE may detect the NPSS in various methods according to implementation of the UE. For example, considering the NPSS structure defined in section 10.2.7.1 of 3GPP TS 36.211 (see Equation 1), the NB-IoT UE may detect the NPSS by attempting to detect 11 repeated OFDM symbols. For each OFDM symbol, it may be necessary to remove a cover code S(l) (see Table 6) defined in Table 10.2.7.1.1-1 of 3GPP TS 36.211 in the NPSS detection process.

If the corresponding symbol is detected, the UE may estimate a carrier frequency offset (CFO) by estimating a phase offset at the time of detection. In addition, the UE may estimate a correct timing through cross-correlation of dl(n) by compensating the received signal with the estimated CFO.

Subsequently, the UE detects $N_{ID}^{Ncell}$ and a frame number by attempting to detect the NSSS (see Equation 2) as defined in section 10.2.7.2 of 3GPP TS 36.211.

$N_{ID}^{Ncell}$ is derived from Table 10.2.7.2.1-1 of 3GPP TS 36.211 and a Zadoff-Chu sequence of length 131. The frame number may be detected by estimating a cyclic shift value.

As illustrated in FIG. 12, the NSSS is transmitted in subframe #9 of an even-numbered radio frame, and the UE may detect the boundary of a 10-ms radio frame after detecting the NPSSS. However, since the UE is not capable of distinguishing between an even-numbered radio frame and an odd-numbered radio frame, in units of 20 msec, the UE attempts to detect the NSSS every 10 msec.

The following table lists NPSS and NSSS detection times taken for an NB-IoT UE operating in an in-band operation mode to achieve 90% cell detection in a single-cell environment based on the above-described cell search operation. SNRs of −6 dB and −12 dB correspond to normal coverage and extended coverage, respectively, and an SNR of −15 dB corresponds to a maximum coverage environment of the NB-IoT UE. As noted from the table, most of the cell search time of the NB-IoT UE is taken for NPSS detection.

TABLE 9

| SNR | Cell search time (msec) | | Ratio of NPSS detection time to NSSS detection time (%) |
| --- | --- | --- | --- |
| | NPSS | NSSS | |
| −6 dB | 40 | 20 | 200% |
| −12 dB | 480 | 80 | 600% |
| −15 dB | 2560 | 400 | 640% |

A proposed configuration of the present disclosure based on the above-described technical configuration will be described below.

4.1. Proposal 1 (Radio Frame Structure of Anchor Carrier Including aNPSS and aNSSS)

TABLE 10

| $n_f$ mod 4 | Subframe number | | | | | | | | | |
|---|---|---|---|---|---|---|---|---|---|---|
| | 0 | 1 | 2 | 3 | 4 | 5 | 6 | 7 | 8 | 9 |
| 0 | MIB | | | | SIB1 | NPSS | aNPSS | | | NSSS |
| 1 | MIB | | | | (SIB1) | NPSS | aNPSS | | | aNSSS |
| 2 | MIB | | | | SIB1 | NPSS | aNPSS | | | NSSS |
| 3 | MIB | | | | (SIB1) | NPSS | aNPSS | | | aNSSS |

TABLE 11

| $n_f$ mod 4 | Subframe number | | | | | | | | | |
|---|---|---|---|---|---|---|---|---|---|---|
| | 0 | 1 | 2 | 3 | 4 | 5 | 6 | 7 | 8 | 9 |
| 0 | MIB | | | | SIB1 | NPSS | | | | NSSS |
| 1 | MIB | | | | (SIB1) | NPSS | | | | aNPSS |
| 2 | MIB | | | | SIB1 | NPSS | | | | NSSS |
| 3 | MIB | | | | (SIB1) | NPSS | | | | aNSSS |

Table 10 and Table 11 illustrate exemplary radio frame structures for an anchor carrier including an aNSS and an aNSSS proposed in the present disclosure.

In the above tables, "MIB" and "SIB1" represent "MIB-NB" and "SIB1-NB", respectively. "(SIB1)" indicates that "SIB1-NB" may or may not be located at a corresponding subframe position according to Number of NPDSCH and $N_{ID}^{Ncell}$ in Table 16.4.1.3-4 of 3GPP TS 36.213.

In the structure illustrated in Table 10, the aNPSS and the aNSSS are located in subframes #6 and #9, respectively, and the aNSSS is located only in odd-numbered radio frames.

In the structure illustrated in Table 11, both of the aNPSS and the aNSSS are located in subframe #9, and the aNPSS and aNSSS are alternately located in odd-numbered radio frames, without overlap. The transmission order of the aNPSS and the aNSSS may be changed.

Now, a detailed description will be given of specific features of the structures of Tables 10 and 11.

4.1.1. Features of Structure in Table 10

As noted from Table 9, since NPSS detection occupies a major proportion of the cell search time of the UE, the aNPSS needs to be transmitted more times than the aNSSS. In addition, the NB-IoT UE may be allocated a gap during a specific time period in view of neighbor cell measurement or serving cell tracking. In order to minimize radio frequency (RF) power consumption, it may be favorable in terms of power consumption to configure the aNPSS and the legacy NPSS in adjacent subframes.

Therefore, as illustrated in Table 10, the aNPSS is located in subframe #6, so that the NB-IoT UE may be configured not to repeat RF-on and RF-off to receive both of the NPSS and the aNPSS. For example, if the NPSS and the aNPSS are located in non-adjacent subframes (or transmitted in the corresponding subframes), the NB-IoT UE may need to turn on/off RF before and after each subframe, thereby causing additional power consumption before and after the RF on/off period.

Further, if the position of the aNPSS is not fixed to the same specific subframe in every radio frame, the NB-IoT UE requires an additional memory to accumulate NPSS auto-correlations or cross-correlations every 10 msec.

The NB-IoT UE may attempt to detect the NSSS after detecting the radio frame boundary every 10 msec using the NPSS (or using even the aNPSS) during initial cell search.

Because the NB-IoT UE is not aware of the position of an even-numbered radio frame which comes every 20 msec, the NB-IoT UE may detect the NSSS at the position of every subframe #9.

Therefore, if the added aNSSS is located at a position other than subframe #9, the NB-IoT UE should receive another subframe (carrying the aNSS) as well as every subframe #9, suffering from power loss.

On the contrary, if the aNSSS is located in an odd-numbered radio frame, the NB-IoT UE attempts to detect the NSSS and the aNSSS at the position of every subframe #9, thereby minimizing the RF power loss. However, subframe #6 carrying the aNPSS may have limitations to be used as a multicast broadcast single frequency network (MBSFN) subframe at the base station in the in-band operation mode. According to the present disclosure, the aNPSS may be transmitted only in subframe #6 of some radio frames within a period of 40 msec in order to solve the above problem.

4.1.2. Features of Structure in Table 11

As described before in section 4.1.1, the base station may use a subframe other than subframes #0, #4, #5, and #9 as an MBSFN subframe in a legacy wireless communication system. In this regard, the aNPSS and the aNSSS may be configured to be alternately located in subframe #9 of odd-numbered radio frames (or to be alternately transmitted in subframe #9 of odd-numbered radio frames). The transmission order of the aNPSS and the aNSSS may be changed.

However, as described before in relation to the cell search process, accumulative detection of the aNPSS every 10 msec at the NB-IoT UE may increase complexity, which may also be the case with the aNSSS. On the other hand, the above configuration may be useful, when the NB-IoT UE acquires synchronization with the serving cell base station or a target cell for measurement, at or above a radio frame level.

4.1.3. Conclusion

In the above-described structure of Table 10, the NRS may be configured not to be transmitted in subframe #9 including (or carrying) the NSSS and the aNSSS. To prevent a legacy NB-IoT UE from expecting the NRS in subframe #9 of an odd-numbered radio frame, it is necessary to indicate the subframe (e.g., subframe #9) as 0 in DL-Bitmap-NB.

Likewise in the structure of Table 11, it is necessary to indicate subframe #9 of an odd-numbered radio frame carrying the aNPSS and the aNSSS as 0 in DL-Bitmap-NB.

In contrast, aNPSS and aNSSS sequences may be replaced with the NRS in the resources of NRS REs in a subframe that the legacy NB-IoT UE uses as a measurement subframe.

Alternatively, when the aNPSS and the aNSSS are used as RSs in a measurement subframe, the aNPSS and the aNSSS may not include the NRS regardless of the operation mode of the NB-IoT UE.

Further, the aNSSS of subframe #9 in Table 10 and Table 11 may be replaced by the aNPSS, and the NRS may be transmitted in REs overlapping with an NRS transmission irrespective of an additional synchronization signal (e.g., aNPSS or aNSSS) transmitted in subframe #9, instead of the additional synchronization signal.

The NRS transmitted in the above manner may be used to improve the performance of MIB decoding and radio resource monitoring (RRM) of the UE in the subsequent subframe, that is, subframe #0. That is, the NRS transmitted in subframe #9 may improve the advanced channel measurement performance of multiple subframes using the NRS.

Further, a UE capable of detecting an additional synchronization signal (e.g., aPSS or aNSSS) may additionally use the additional synchronization signal for measurement performance and channel estimation.

Further, when subframe #6 of Table 10 and subframe #9 of Table 10 and Table 11 are configured to deliver a narrowband positioning reference signal (NPRS), the corresponding RS (e.g., NPRS) may be transmitted with priority 4.2. Proposal 2 (Radio Frame Structure of Non-Anchor Carrier Including aNPSS and aNSSS)

TABLE 12

| $n_f$ mod 4 | Subframe number | | | | | | | | | |
|---|---|---|---|---|---|---|---|---|---|---|
| | 0 | 1 | 2 | 3 | 4 | 5 | 6 | 7 | 8 | 9 |
| 0 | aNPSS | | | | aNSSS | NPSS | | | | NSSS |
| 1 | aNPSS | | | | (aNSSS) | NPSS | | | | |
| 2 | aNPSS | | | | aNSSS | NPSS | | | | NSSS |
| 3 | aNPSS | | | | (aNSSS) | NPSS | | | | |

TABLE 13

| $n_f$ mod 4 | Subframe number | | | | | | | | | |
|---|---|---|---|---|---|---|---|---|---|---|
| | 0 | 1 | 2 | 3 | 4 | 5 | 6 | 7 | 8 | 9 |
| 0 | aNSSS | | | | | NPSS | | | | NSSS |
| 1 | aNPSS | | | | | NPSS | | | | |
| 2 | aNSSS | | | | | NPSS | | | | NSSS |
| 3 | aNPSS | | | | | NPSS | | | | |

Table 12 and Table 13 illustrate exemplary radio frame structures for a non-anchor carrier including an aNPSS and an aNSSS proposed in the present disclosure. "NPSS" and "NSSS" are indicated for reference to the positions of subframes transmitted on an anchor carrier, and the NPSS and the NSSS are not actually transmitted on the non-anchor carrier.

A subframe structure for the non-anchor carrier may be generated by the same base station as that for the anchor carrier or another base station, and the same operation mode as that of the anchor carrier may or may not be applied to the non-anchor carrier. That is, for the non-anchor carrier, it is not necessarily assumed that the subframe structure is generated by the same base station as that for the anchor carrier, and it is not necessarily assumed that the operation mode is identical to that of the anchor carrier. However, it may be assumed that subframe numbers of the anchor carrier and the non-anchor carrier are synchronized with each other.

In the structure of Table 12, the aNPSS and the aNSSS are located in subframes #0 and #4, respectively (or transmitted in the corresponding subframes), and the aNSSS is located only in odd-numbered radio frames (or transmitted in the corresponding subframes).

In the structure of Table 13, both of the aNPSS and the aNSSS are located in subframe #0 (or transmitted in the corresponding subframe), and the aNPSS and the aNSSS are alternately located in odd-numbered radio frames (or transmitted in the corresponding subframes), without overlap. The transmission order of the aNPSS and aNSSS may be changed.

On the anchor-carrier, the transmission subframes of the NPSS, the NSSS, the NPBCH, and SIB1-NB may correspond to subframes #5, #9, #0 and #4, respectively. These may correspond to the positions of subframes unavailable as MBSFN subframes in a legacy wireless communication system (e.g., the LTE system).

However, when the NPSS, the NSSS, the NPBCH, and SIB1-NB are additionally transmitted to improve cell detection performance and system information (e.g., MIB-NB and SIB1-NB) detection performance of the NB-IoT UE, the non-MBSFN subframes, that is, subframes #0, #4, #5, and #9 may not be enough. In this case, the NPSS and the NSSS may be additionally transmitted on the non-anchor carrier, wherein the NPSS and the NSSS transmitted additionally on the non-anchor carrier may be referred to as aNPSS and aNSSS, respectively.

On the assumption that only non-MBSFN subframes are available for the aNPSS and the aNSSS even on the non-anchor carrier carrying the aNPSS and the aNSSS, the following specific methods may be considered in consideration of a gap period for ensuring a frequency tuning time of the NB-IoT UE. Specific features of the structures of Table 12 and Table 13 will be described below.

4.2.1. Features of Structure in Table 12

In the cell detection process, the UE first detects the NPSS and then the NSSS. If the received power of the NPSS on the anchor carrier is low, the UE may additionally receive the aNPSS on the non-anchor carrier to improve performance. When the NPSS of the anchor-carrier and the aNPSS of the non-anchor carrier are transmitted at the positions of consecutive subframes, the NB-IoT UE needs to perform frequency tuning to the anchor carrier and the non-anchor carrier in a short time. This may be a factor increasing the price of the NB-IoT UE.

Therefore, a sufficient time gap between the NPSS and the aNPSS may be ensured to relieve the requirement of the frequency tuning time for the NB-IoT UE.

In the same manner, the aNSSS may be allocated to subframe #4 among subframes #0, #4, #5, and #9 to ensure a sufficient time gap between the NSSS and the aNSSS. However, the aNSSS may be transmitted in subframe #4 of every radio frame, or only in subframe #4 of odd-numbered or even-numbered radio frames.

4.2.2. Features of Structure in Table 13

As described above, the base station may use subframes other than subframes #0, #4, #5, and #9 as MBSFN subframes in a legacy wireless communication system (e.g., the LTE system). Therefore, both of the aNPSS and the aNSSS according to the present disclosure may be located in subframe #0 (or transmitted in subframe #0).

If the transmission order of the aNPSS and the aNSSS is changed, the NSSS may be transmitted in subframe #0 of the subsequent radio frame after NSSS transmission on the anchor carrier. However, in this case, this operation may not be preferable in view of the frequency tuning gap of the NB-IoT UE for receiving the signals.

Therefore, radio frames carrying the aNPSS and the aNSSS may be configured as illustrated in Table 13 as a method of ensuring a sufficient frequency tuning gap between the NSSS and the aNSSS.

In the configurations of Table 12 and Table 13, the aNPSS and the aNSSS transmitted on the non-anchor carrier may be identical to the NPSS and the NSSS transmitted on the anchor carrier of the legacy wireless communication system, respectively, or may be configured in the following method.

4.3. Proposal 3 (aNPSS Configuration)

An NPSS sequence defined in section 10.2.7.1 of 3GPP TS 36.211 is given as follows. For reference, the following equation is the same as the afore-described Equation 1.

$$d_{l(n)}=S(l)e^{-j\pi un(n-1)/11} \text{ where } n=0,1,\ldots,10 \quad \text{[Equation 4]}$$

Because u is defined as 5, Equation 4 describes a Zadoff-Chu sequence of length 11 with root 5.

The Zadoff-Chu sequence is transmitted across 11 OFDM symbols, each of which is generated by multiplying a cover code S(l) defined in Table 10.2.7.1.1-1 of 3GPP TS 36.211 (see Table 6) by the Zadoff-Chu sequence. This configuration applies equally to the NPSS of all NB-IoT anchor carriers.

If the added aNPSS is configured with the same signal as the legacy NPSS defined in Equation 4, the NB-IoT UE may not determine whether a detected sequence is received from a base station which transmits both of the NPSS and the aNPSS or base stations which have different transmission timings.

Therefore, the aNPSS needs to be configured differently from the legacy NPSS. In addition, the aNPSS needs to be designed in such a manner that the peak-to-average ratio (PAPR) of the aNPSS is not higher than that of the NPSS, and the increase of the implementation complexity and computational complexity of the NB-IoT UE is minimized. To this end, a method of designing an aNPSS by modifying the root index and the cover code S(1) of a Zadoff-Chu sequence, while still using the structure of the legacy NPSS structure according to the present disclosure will be described below.

4.3.1. Zadoff-Chu Sequence

A u value of 6 in Equation 4 may be applied to the aNPSS proposed in the present disclosure.

Generally, when the roots of Zadoff-Chu sequences of length L are u and Lu, the two sequences are in the complex conjugate relationship. Therefore, a cross-correlation may be calculated through one complex multiplication in every sample. Further, the same PAPR property as that of the legacy NPSS may be achieved accordingly, and the cross-correlation value with the legacy NPSS within a length-L sequence may be as low as $1/\sqrt{L}$.

Accordingly, the legacy NB-IoT UE has a high probability of failing to detect the aNPSS, and the NB-IoT UE using the aNPSS may reuse a cross-correlation module for the NPSS.

Further, the above configuration is particularly advantageous in terms of complexity, when it may not be determined whether the base station has transmitted the aNPSS on the corresponding anchor carrier during initial cell search. Also, since the aNPSS has the same structure as a sequence defined in the legacy wireless communication system, the same weight may advantageously be applied in accumulating respective cross-correlation values of the NPSS and the aNPSS.

4.3.2. Cover Code

The NB-IoT UE may perform cell search based on an auto-correlation property in NPSS detection by using the characteristics of the cover code S(1) defined in Equation 4. Considering this UE implementation, it may be difficult to distinguish the proposed aNPSS to which root u=6 is applied from the legacy NPSS to which root u=5 is applied.

Therefore, it is necessary to apply a new cover code with low cross-correlation with the NPSS cover code to the aNPSS.

Figure 14:
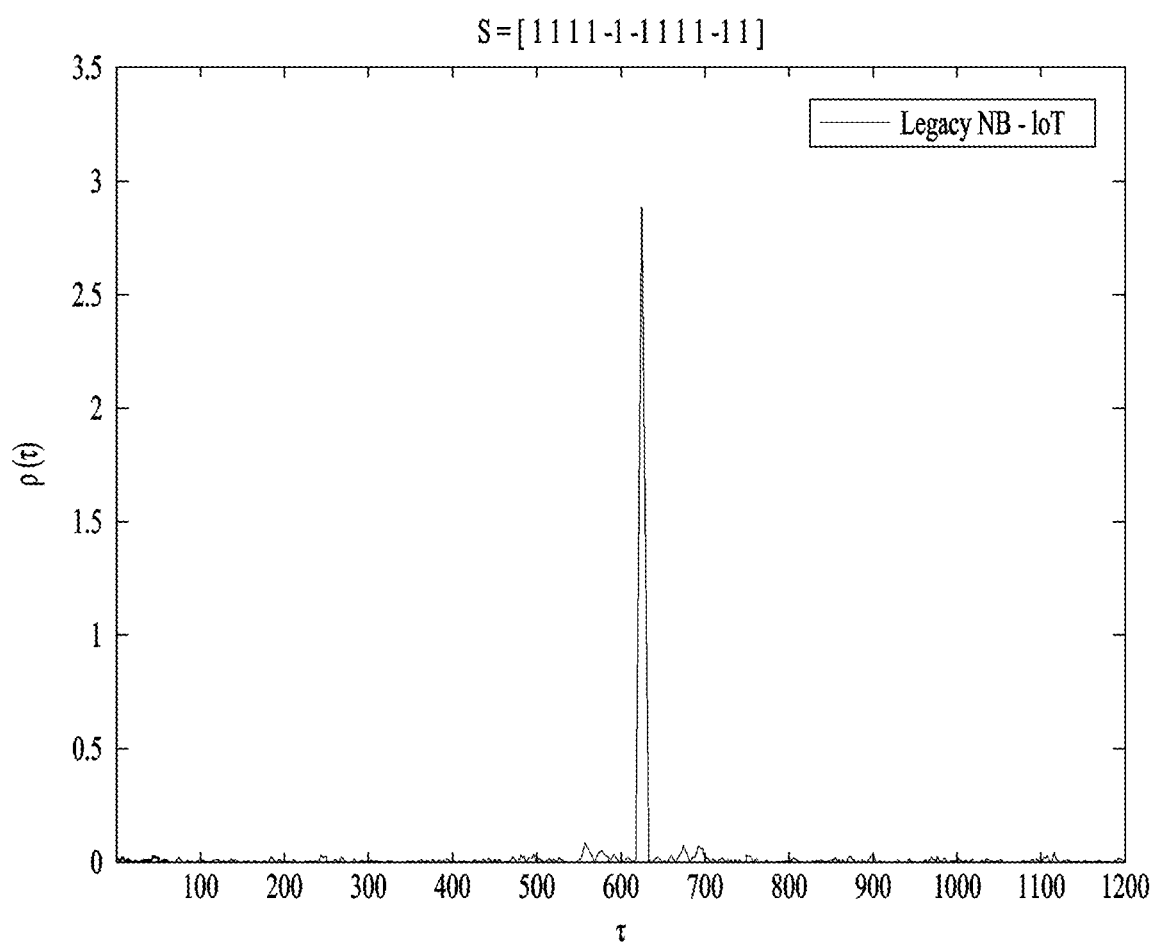
FIG. 14 is a diagram illustrating the auto-correlation property of a narrowband primary synchronization signal (NPSS) based on a cover code of a legacy NPSS.
Figure 15:
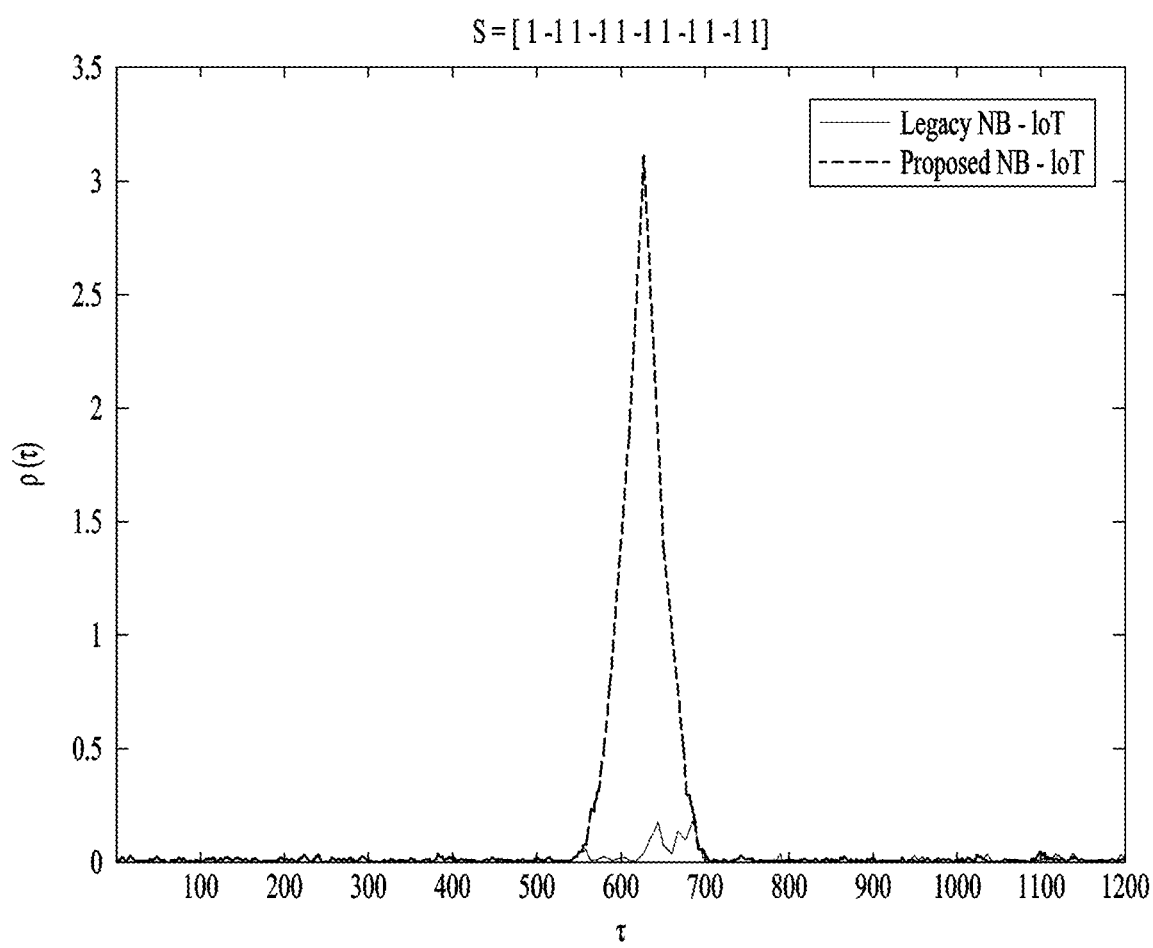
FIGS. 15, 16 and 17 are diagrams illustrating auto-correlation properties, when a cover code proposed for an additional narrowband primary synchronization signal (aNPSS) according to the present disclosure is applied.
Figure 16:
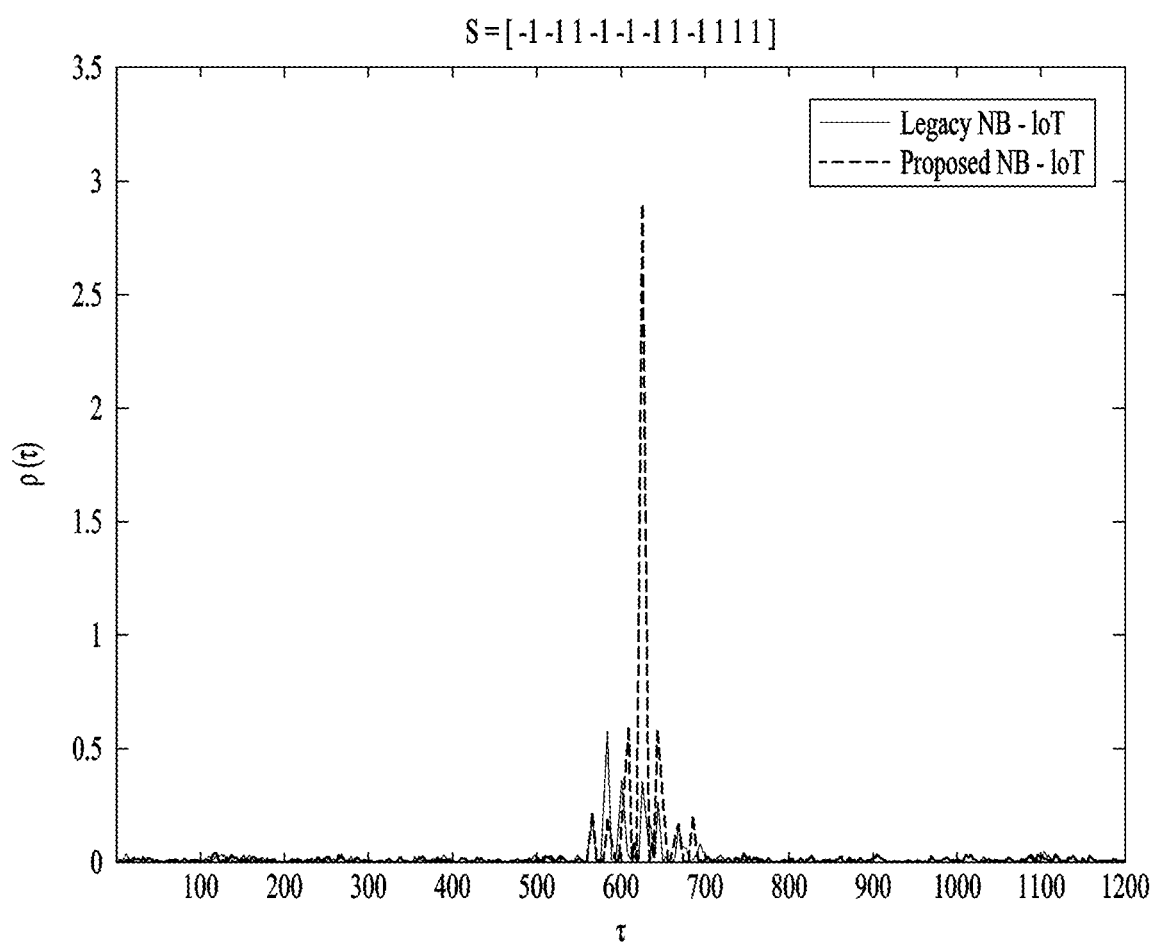
Figure 17:
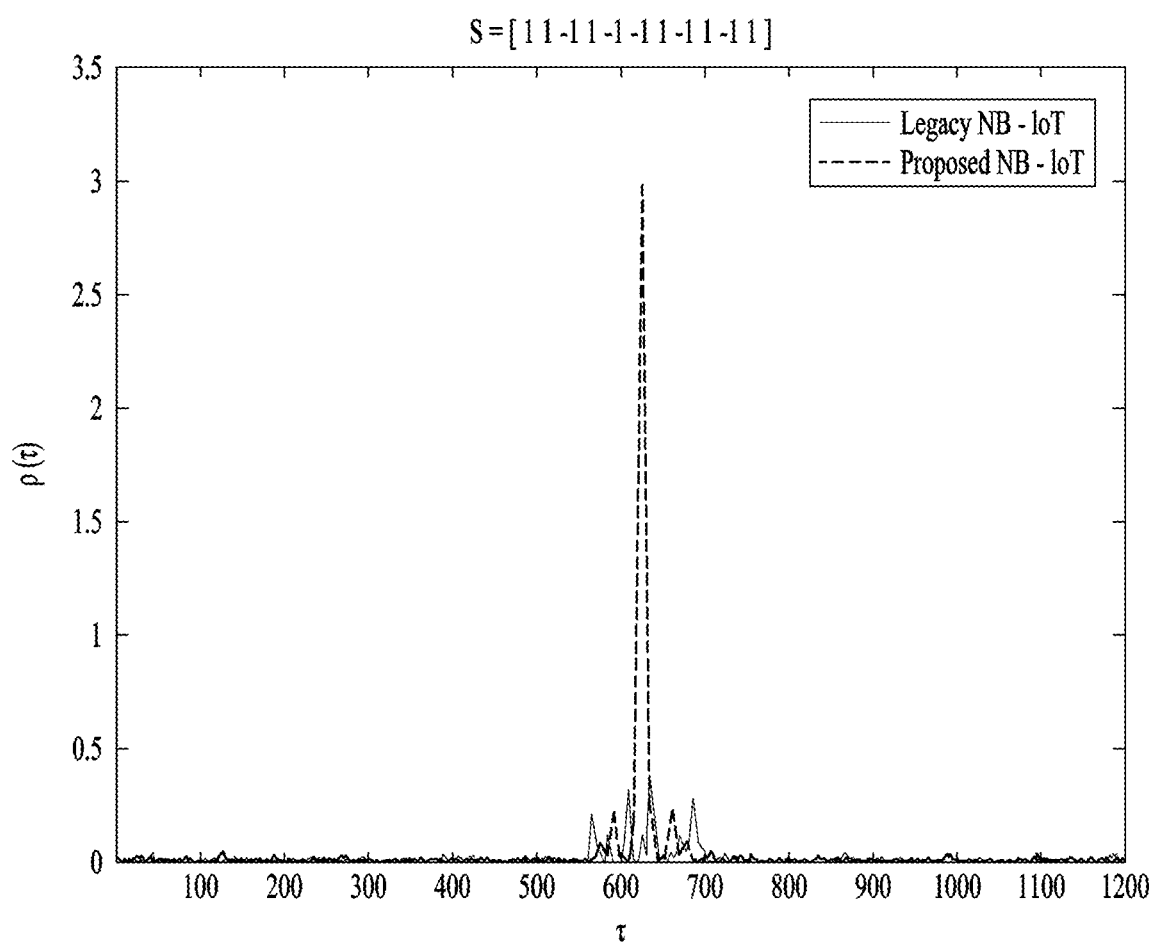

FIG. 14 is a graph illustrating the auto-correlation property of an NPSS based on a cover code of the legacy NPSS, and FIGS. 15, 16 and 17 are graphs illustrating auto-correlation properties, when a cover code proposed for the aNPSS according to the present disclosure is applied.

More specifically, FIG. 14 is a graph illustrating the auto-correlation property of the NPSS, when a cover code S=[1 1 1 1 −1 −1 1 1 −1 −1] is applied to the legacy NPSS, and FIG. 15 is a graph illustrating the auto-correlation property of the aNPSS, when a cover code S=[1 −1 1 −1 1 −1 1 −1 1 −1 1] is applied to the aNPSS, FIG. 16 is a graph illustrating the auto-correlation property of the aNPSS, when a cover code S=[−1 −1 1 −1 −1 −1 1 −1 1 1 1] is applied to the aNPSS, and FIG. 17 is a graph showing the auto-correlation property of the aNPSS, when a cover code S=[1 1 −1 1 −1 −1 1 −1 1 −1 1 1] is applied to the aNPSS.

In FIGS. 14 to 17, a graph corresponding to 'legacy NB-IoT' represents a case in which the NB-IoT UE estimates an auto-correlation by using a legacy NPSS cover code, and a 'Proposed NB-IoT graph' represents a case in which an auto-correlation is estimated by applying the newly proposed cover code in each figure. Further, in FIGS. 14 to 17, an auto-correlation p(τ) represents ρ_m(τ) of Step-3 defined in section 5.2 of 3GPP contribution R1-161981.

As illustrated in FIG. 14, when the cover code of the NPSS is used, the auto-correlation has a maximum value at a specific accurate timing T, and a (narrow) peak value around the timing. In addition, a side peak value excluding a peak including the maximum value is relatively low.

On the other hand, in the case of the cover code applied in FIG. 15, although the cover code has little side peak value, it has a (wide) peak over a wide area around the correct timing. In this case, the timing estimation performance of the UE may be degraded.

In the case of the cover code applied in FIG. 16, the cover code has a narrow peak at the correct timing position, but has a relatively high side peak value over an immediately adjacent region.

In FIG. 17, at an accurate timing position, the cover code has a narrow peak similar to that in FIG. 14, and has a lower side peak than that in FIG. 16. Also, it may be confirmed that the cover code has an auto-correlation property (an auto-correlation value about 8 times lower than the NPSS auto-correlation maximum value in FIG. 13) which has little influence on NPSS detection of the legacy NB-IoT UE.

In this context, it is proposed that [1 1 −1 −1 −1 −1 −1 −1 −1 1] is applied as the cover code S(1) of the aNPSS in the present disclosure.

4.3.3. Conclusion

The root (u=6) of the Zadoff-Chu sequence and S=[1 1 −1 −1 −1 −1 −1 −1 −1 1] proposed in the above section 4.3.1. and 4.3.2. may be simultaneously applied to the aNPSS proposed in the present disclosure.

Alternatively, the root (u=6) of the Zadoff-Chu sequence and S=[1 1 −1 −1 −1 −1 −1 −1 −1 1] proposed in the above sections 4.3.1. and 4.3.2. may be cross-applied with the root (u=5) of the legacy NPSS and the legacy cover code. Specifically, the aNPSS according to the present disclosure may be configured by combining the legacy NPSS (u=5) and the proposed S=[1 1 −1 −1 −1 −1 −1 −1 −1 1] or combining the cover code of the legacy NPSS with the proposed root (u=6).

4.4. Proposal 4 (aNSSS Configuration)

An NPSS sequence is defined as follows in section 10.2.7.2 of 3GPP TS 36.211. For reference, the following equation is identical to the afore-described Equation 2.

$$d(n)=b_q(m)e^{-j2\pi\theta_f n}e^{-j\pi un'(n'+1)/131} \text{ where}$$
$$n=0,1,\ldots,131 \quad \text{[Equation 5]}$$

θr applied to Equation 5 is defined by the following equation.

$$\theta_f = \frac{33}{132}(n_f/2) \bmod 4 \qquad \text{[Equation 6]}$$

In Equation 6, $N_{ID}^{Ncell}$ is determined by q and u of Equation 5, and the frame number $n_f$ is defined by $\theta_f$. Compared to the NPSS, the NSSS is not transmitted repeatedly during 11 OFDM symbol periods to which different cover codes are applied. Rather, the NSSS is transmitted by allocating the sequence defined by Equation 5 to 132 REs in a frequency-first mapping manner.

If the aNSSS is defined by modifying u and $\theta_f$ among information forming the NSSS sequence, the aNSSS may affect NSSS detection of a legacy NB-IoT UE. Therefore, the present disclosure proposes methods of configuring an aNSSS by additionally defining $b_q(m)$ (see Table 8) of the NSSS defined in Table 10.2.7.2.1-1 of 3GPP TS 36.211 and by modifying the NSSS sequence mapping scheme defined in section 10.2.7.2.2 of 3GPP TS 36.211, or the like.

However, even though a new value is added according to the implementation of the NB-IoT UE, performance may not be affected much. Therefore, the present disclosure also proposes a method of additionally defining a value of $\theta_f$ for an aNSSS.

4.4.1. Method of Adding $\theta_f$

As noted from Equation 6, $\theta_f$ has a value of 0, 33/132, 66/132, or 99/132 every 20 msec.

On the other hand, for the aNSSS proposed in the present disclosure, Of may be 33/264, 99/264, 165/264, or 231/264, cyclically every 20 msec, may cyclically be the values of a subset of the four values, or may be fixed to a specific value out of the four values.

Figure 18:
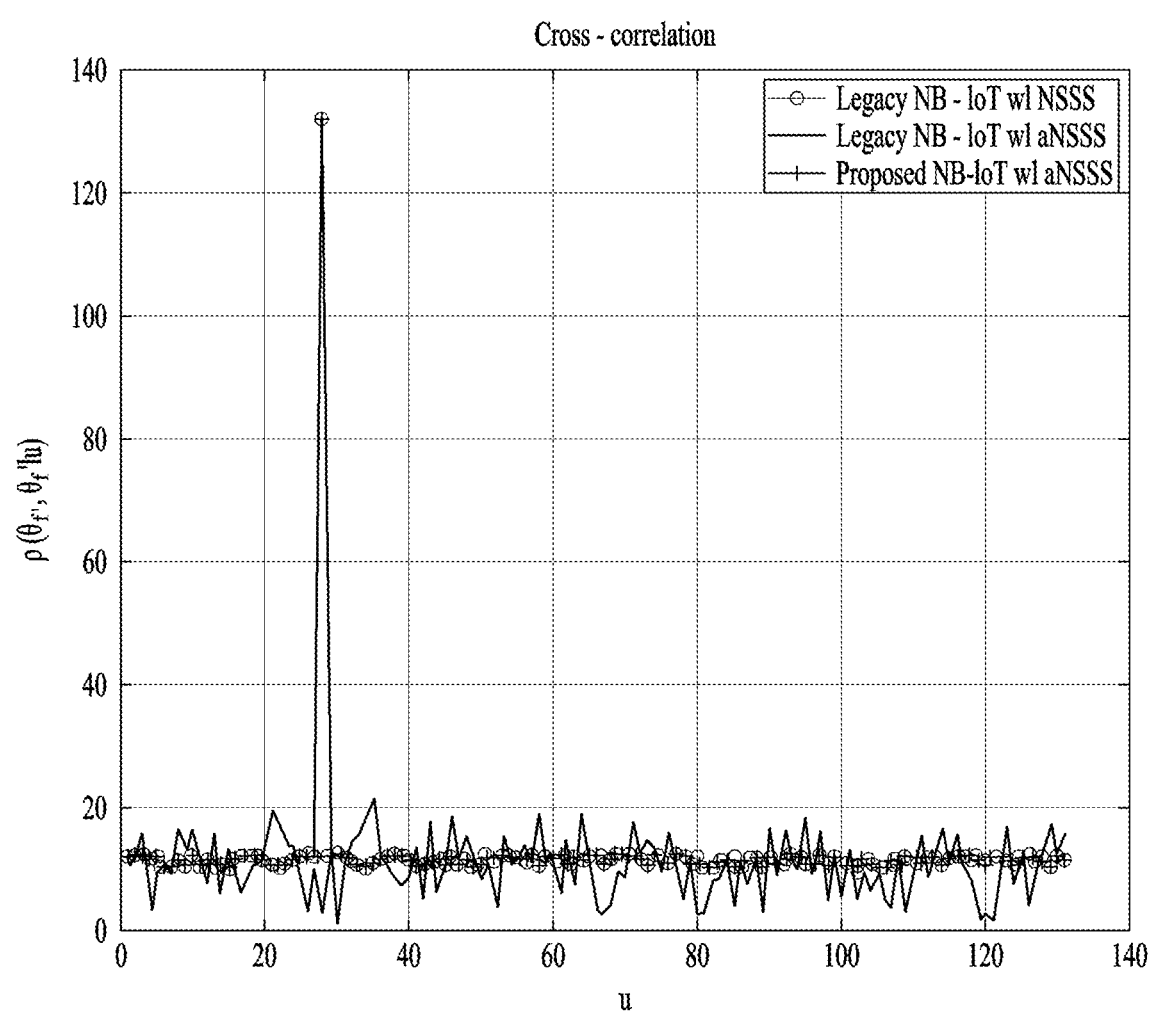
FIG. 18 is a diagram illustrating a cross-correlation value in the case of using a legacy narrowband secondary synchronization signal (NSSS) (Legacy NB-IoT with NSSS), a cross-correlation value based on a $\theta_f$ value applied to an additional narrowband secondary synchronization signal (aNSSS) (Proposed NB-IoT with aNSSS) when the aNSSS to which one of 33/264, 99/264, 165/264, and 231/264 is applied as the $\theta_f$ value is received, and a cross-correlation value based on a $\theta_f$ value applied to an NSSS (Proposed NB-IoT with NSSS).

FIG. 18 is a diagram illustrating a cross-correlation value in the case of using a legacy NSSS (Legacy NB-IoT with NSSS), a cross-correlation value based on a $\theta_f$ value applied to an aNSSS (Proposed NB-IoT with aNSSS) when the aNSSS to which one of 33/264, 99/264, 165/264, and 231/264 is applied as the $\theta_f$ value is received, and a cross-correlation value based on a $\theta_f$ value applied to an NSSS (Proposed NB-IoT with NSSS).

As illustrated in FIG. 18, it may be noted that the cross-correlation values of an aNSSS using $\theta_f$={33/264, 99/264, 165/264, 231/264} different from $\theta_f$={0, 33/132, 66/132, 99/132} used for the NSS do not have large mutual interference. A set of values other than {0, 33/132, 66/132, 99/132} may be selected as $\theta_f$ of the aNSSS through the above cross-correlation observation. Compared to a case of using only the legacy $\theta_f$, however, the above configuration may require a more memory capacity for sequence generation in the NB-IoT UE.

4.4.2. Method of Adding $b_q(m)$

The aNSSS may be configured by changing $b_q(m)$ of the NSS defined in Table 10.2.7.2.1-1 of TS 36.211 or adding $b_q(m)$, without changing the Zadoff-Chu sequence of the NSSS. Advantageously, the legacy NB-IoT UE may not attempt to detect the changed or added $b_q(m)$, whereas the NB-IoT UE attempting to detect the aNSSS may reuse the result of complex multiplication used for NSSS detection.

Therefore, instead of $1^{st}$, $32^{th}$, $64^{th}$, and $128^{th}$ columns of a Hadamard matrix of order 128, used for $b_q(m)$ of the legacy NSSS, $16^{th}$, $48^{th}$, $80^{th}$, and $112^{th}$ columns of the Hadamard matrix may additionally be used for $b_q(m)$ of the aNSSS.

4.4.3. Method of Modifying Resource Mapping Method

In a frequency selective environment, the cross-correlation property of an NSSS sequence may become poor. Accordingly, a method of randomizing the cross-correlation property between the NSSS and the aNSSS during resource mapping may be considered.

FIGS. 19 to 22 are simplified diagrams illustrating resource mapping methods applicable to the present disclosure, and FIGS. 23 to 26 are diagrams illustrating the NSSS Zadoff-Chu cross-correlation properties of a legacy NB-IoT UE according to the resource mapping methods illustrated in FIGS. 19 to 22.

In the resource mapping methods illustrated in FIGS. 19 to 22, the NSSS or the aNSSS is allocated sequentially to resources in a frequency-first or time-first mapping manner along sold arrow lines and dotted arrow lines, starting from the position of a $k_s$-th RE in a is-th OFDM symbol and ending at the position of a $k_e$-th RE in a $l_e$-th OFDM symbol.

Figure 19:
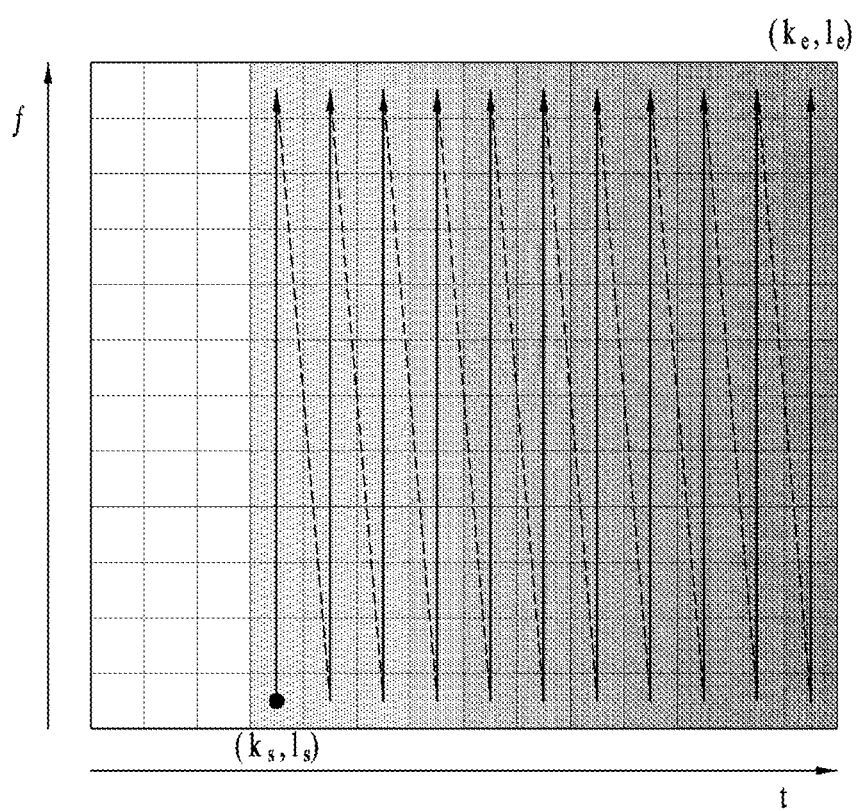
FIGS. 19 to 22 are simplified diagrams illustrating a resource mapping method applicable to the present disclosure.
Figure 20:
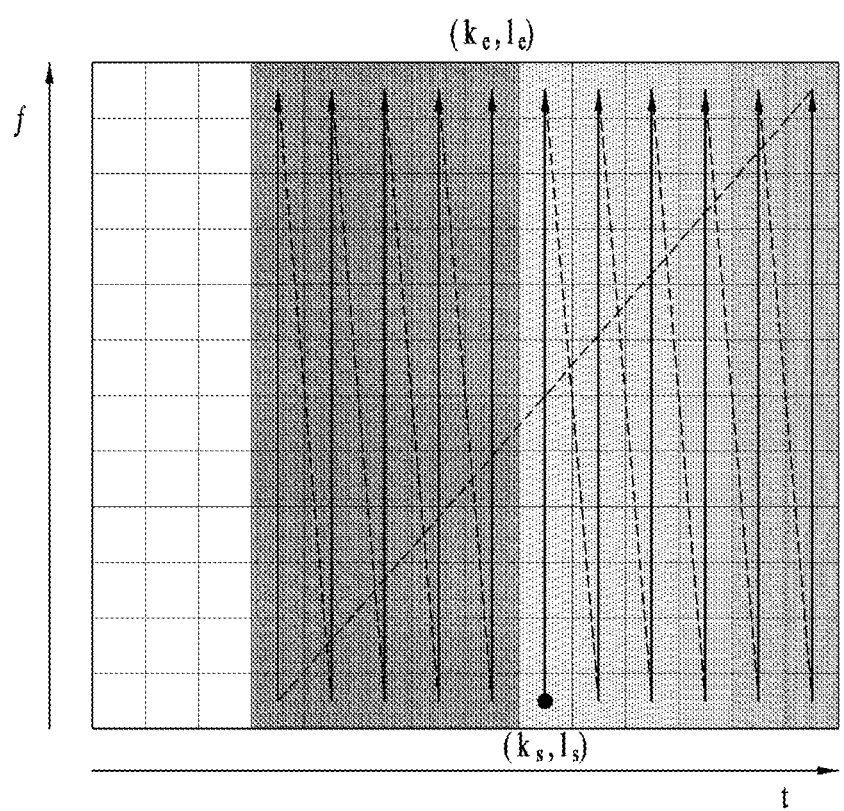
Figure 21:
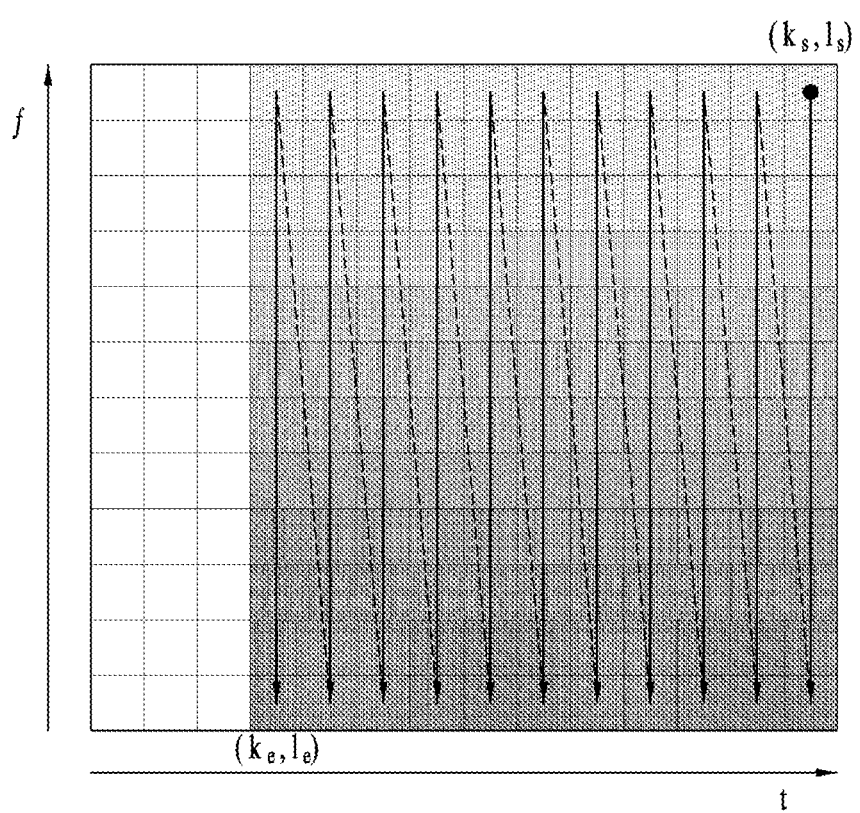
Figure 22:
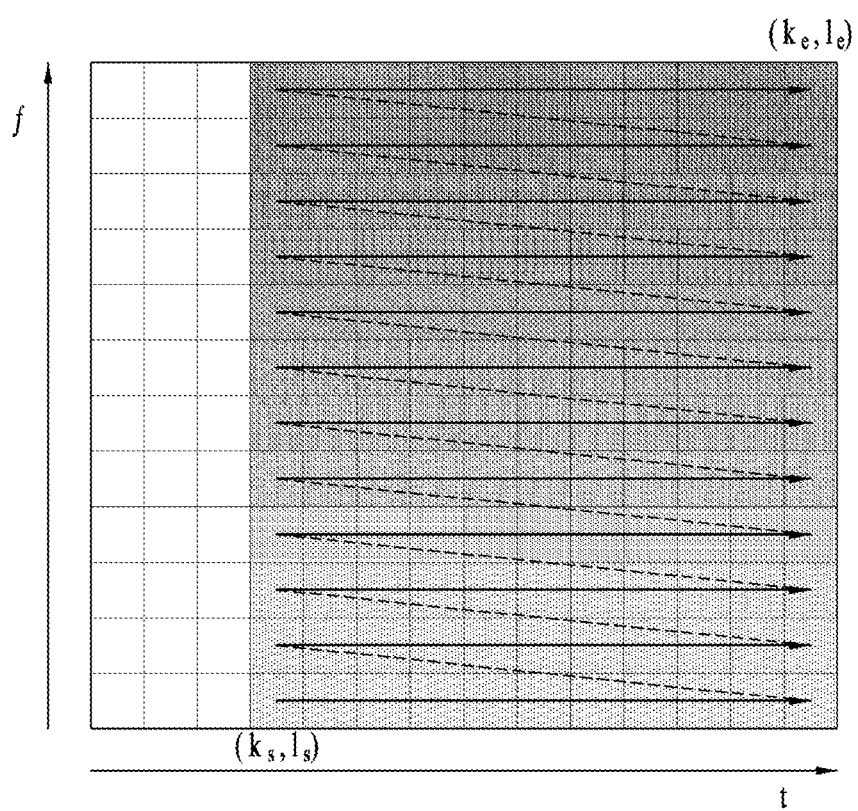

FIG. 19 illustrates a legacy NSSS resource mapping method, and FIG. 20 (Alt.1-1) illustrates a method of shifting a starting OFDM symbol position by a specific value in the resource mapping method of FIG. 19. FIG. 21 (Alt.2-1) illustrates a resource mapping method in which the resource mapping order of FIG. 19 is reversed. FIG. 22 (Alt.2-2) illustrates a method of applying time-first mapping, although this method is identical to the resource mapping method of FIG. 19 in terms of the starting and ending positions.

Figure 23:
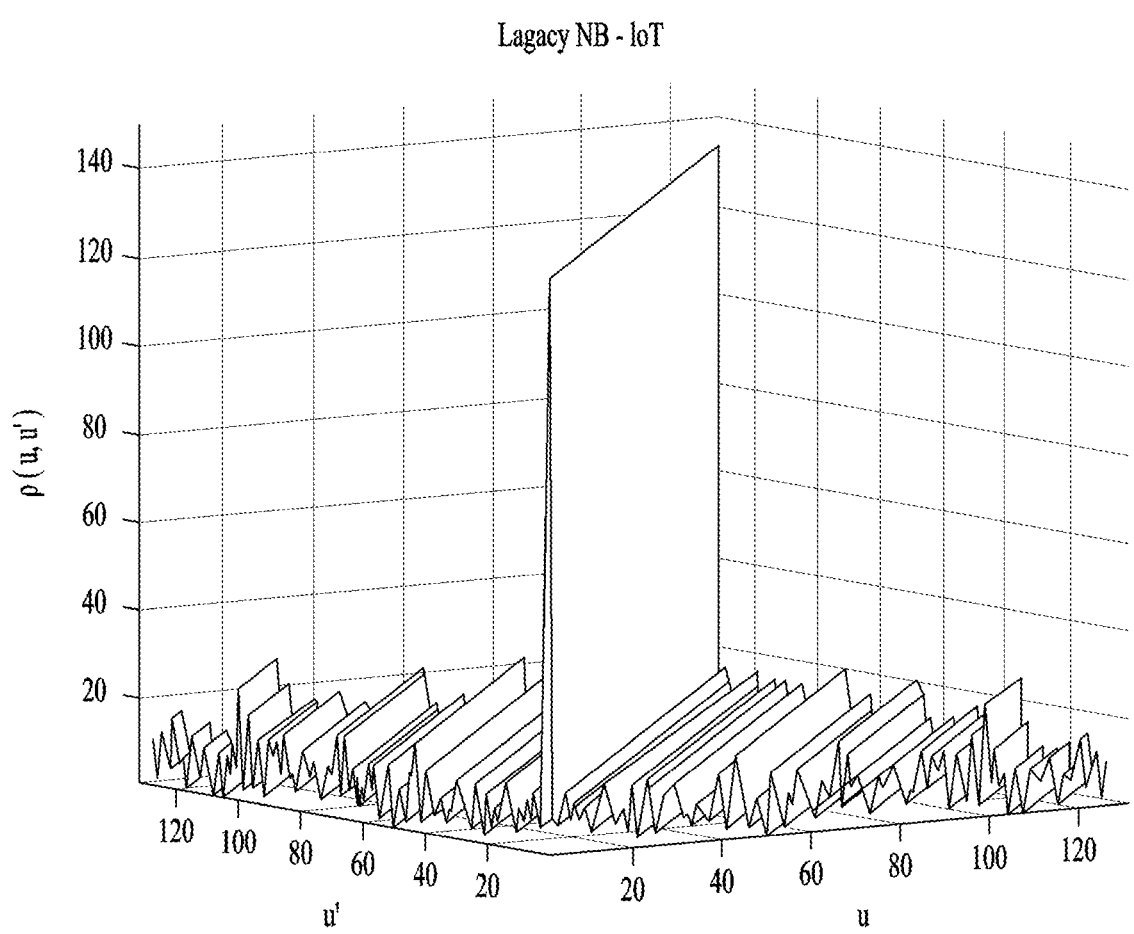
FIGS. 23 to 26 are diagrams illustrating the NSSS Zadoff-Chu cross-correlation properties of a legacy NB-IoT user equipment (UE) according to resource mapping schemes illustrated in FIGS. 19 to 22.

As illustrated in FIG. 23, when u and u' are equal, the cross-correlation property of the NSSS Zadoff-Chu sequence of the legacy NB-IoT UE has a value equal to a sequence length, and otherwise, the cross-correlation property is relatively low.

Figure 24:
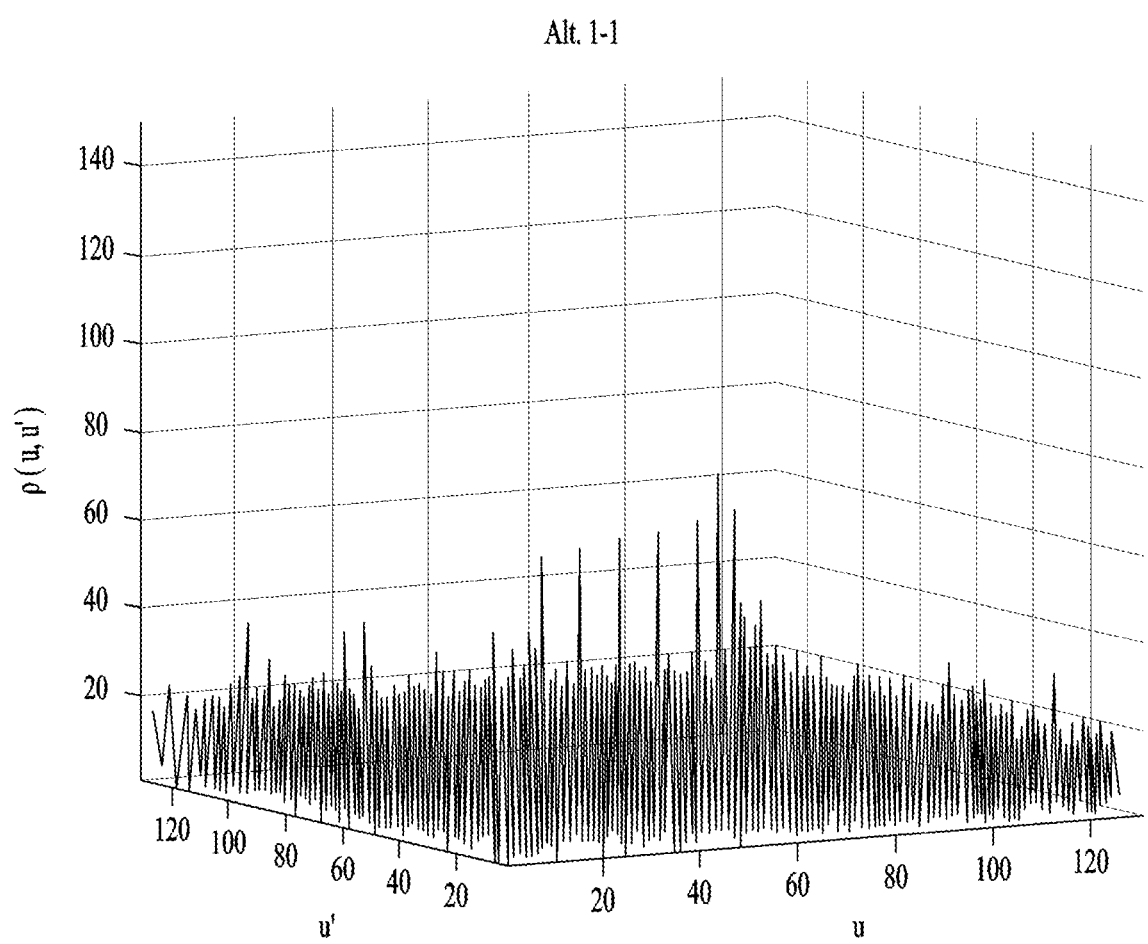
Figure 25:
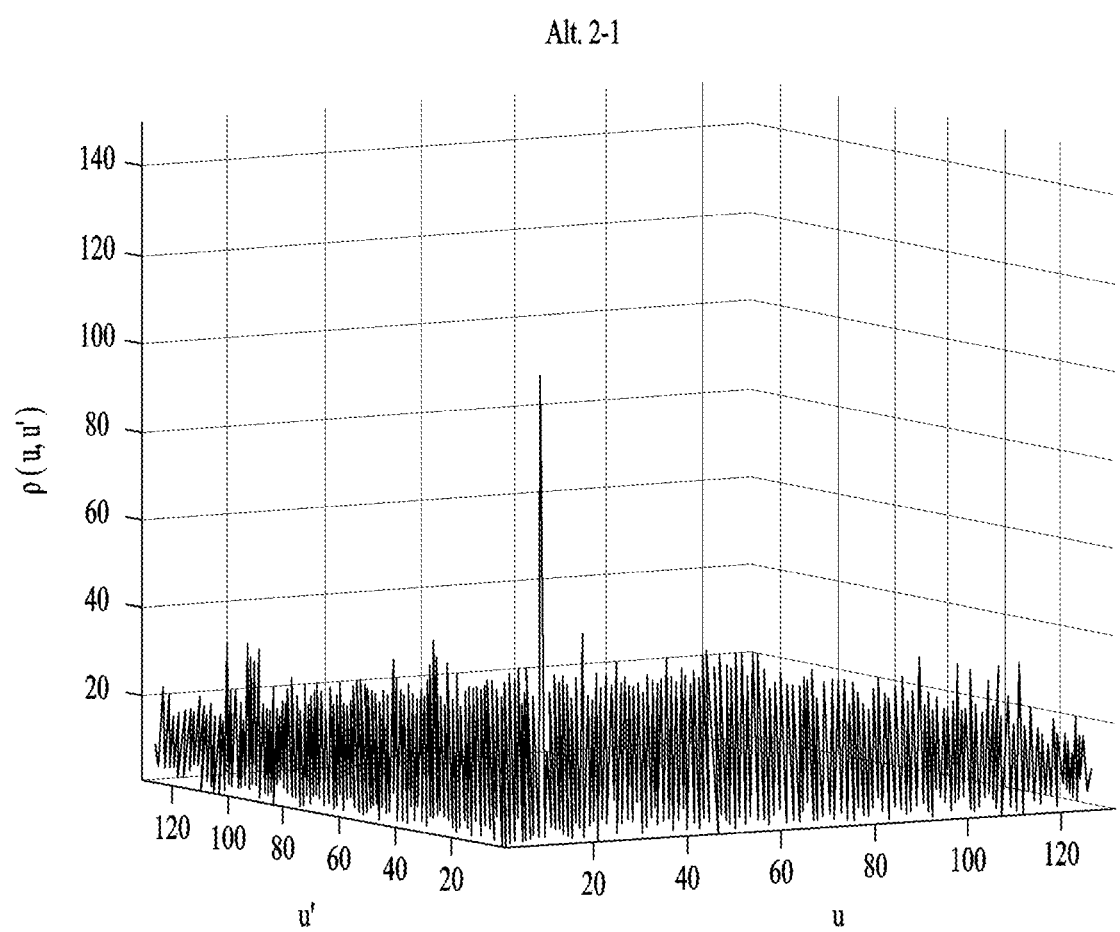
Figure 26:
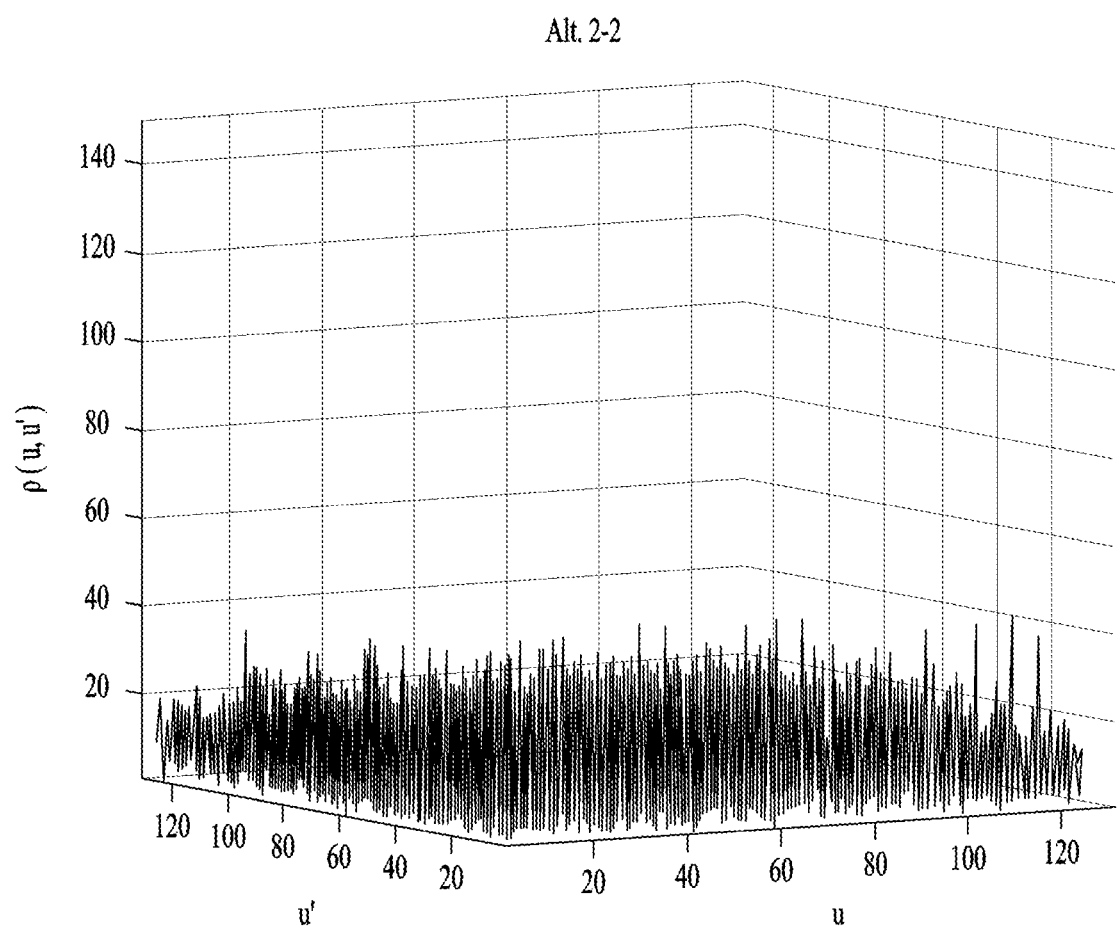

As illustrated in FIG. 24, according to the resource mapping method (Alt.1-1) of FIG. 20, the cross-correlation property with the legacy NSSS Zadoff-Chu sequence has values corresponding to about 50% at some combinations of u and u'. As illustrated in FIG. 25, according to the resource mapping method (Alt.2-1) of FIG. 21, the cross-correlation property with the legacy NSSS Zadoff-Chu sequence is low at most of u and u' combinations, but has a value of about 70% or higher at a specific u and u' combination. As illustrated in FIG. 26, according to the resource mapping method (Alt.2-2) of FIG. 22, it may be noted that the cross-correlation property with the legacy NSSS Zadoff-Chu sequence has relatively low values at all of u and u' combinations.

Therefore, the present disclosure proposes a configuration for applying the resource mapping method of FIG. 22 as a resource mapping method for an aNSSS. The proposed method Alt.2-2 is characterized by time-first resource mapping, in which the starting and ending RE positions of resource mapping may be circularly shifted by a specific value.

Additionally, the method of adding $\theta_r$, described in section 4.4.1 and the method of adding $b_q(m)$, described in section 4.4.2 are not necessarily applied at the same time. Further, a resource mapping method other than the resource mapping method proposed in section 4.4.3. may be applied to the aNSSS.

Further, the column values of the Hadamard matrix of order 128 for $b_q(m)$ proposed in section 4.4.2. may be applied at the same time in combination with the proposed resource mapping method Alt.2-2 proposed in section 4.4.3. $b_q(m)$ of the legacy NSSS and the resource mapping method, Alt.2-2 may also be applied at the same time in combination. The legacy NSSS resource mapping method and the column values of the Hadamard matrix of order 128, used for the proposed $b_q(m)$ may also be applied at the same time in combination.

4.5. Proposed Method of Transmitting aNPSS and/or aNSSS

The structures and transmission positions of the NPSS and the NSSS (that is, aNPSS and NSSS) proposed in the present disclosure may be independently applied even when only the NPSS or only the NSSS is additionally transmitted. That is, even when an NPSS and an NSSS having new sequences other than the NPSS and the NSSS proposed in the present disclosure are additionally transmitted, the positions of subframes and a radio frame in which the sequences are further transmitted may be determined based on the features proposed in the present disclosure.

Upon detection of the proposed aNPSS and aNSSS, the NB-IoT UE may determine that system information (e.g., information of MIB-NB and SIB1-NB) may be additionally transmitted. That is, the NB-IoT UE may attempt to detect the additional MIB-NB and SIB1-NB along with an attempt to detect the legacy MIB-NB and SIB1-NB, depending on whether the NB-IoT UE has detected the aNPSS and aNSSS. In the opposite case, when the NB-IoT UE determines that a cell provides additional system information, the NB-IoT UE may additionally determine whether the aNPSS and the aNSSS of the cell are transmitted.

This is because considering that maximum propagation distances for cell search and system information acquisition are designed to be as close as possible, enhancement or non-enhancement between a synchronization signal used for the cell search and a channel carrying system information may be referred to.

In the present disclosure, the base station may not always transmit the aNPSS and the aNSSS periodically along with the NPSS and the NSSS. That is, the base station may transmit the aNPSS and the aNSSS during a specific time, when needed.

Further, the periodic or aperiodic transmission of the aNSS and the aNSSS may be determined independently of each other. The base station may separately configure information (e.g., transmission periods and intervals) related to transmission of the aNPSS and aNSSS, for a specific operation of the NB-IoT UE such as measurement. If the NB-IoT UE does not know whether the aNPSS and the aNSSS are transmitted (e.g., when the NB-IoT UE has not acquired system information such as MIB-NB or SIB1-NB and measurement configuration), the NB-IoT UE may be required to blind-detect the aNPSS and the aNSSS. When a specific condition is satisfied, the base station may start or stop the transmission of the aNPSS and the aNSSS. However, for stable operation of the UE which performs measurement or the like based on the aNPSS and the aNSSS, the base station may indicate the start and stop of the aNPSS and aNSSS transmission to all or a part of UEs within a cell.

The techniques proposed in the present disclosure may be applied not only to the NB-IoT system but also to a system such as eMTC which uses part of the LTE system bandwidth. In particular, when a new synchronization signal is transmitted or the legacy PSS and/or SSS is transmitted with a modification to it for cell search enhancement and system information acquisition delay enhancement in eMTC, like the concept of the proposed aNPSS and/or aNSSS, additional transmission of information related to the system information (e.g., MIB and/or SIB1-BR) in the corresponding cell may be indicated. The opposite case may also be true.

That is, when the UE fails to detect a synchronization signal for cell search enhancement during cell search, but enhanced system information is further transmitted in the subsequent process, the UE may expect that an enhanced synchronization signal may be transmitted in the cell. Particularly, when the eMTC UE additionally receives the NPSS and/or the NSSS to improve cell search performance, the following two cases may be considered depending on whether the corresponding cell supports the NB-IoT service.

(1) First, a case in which the cell supports the eMTC and NB-IoT services simultaneously.

The eMTC UE may expect to improve the cell search performance by additionally receiving an NPSS and/or an NSSS transmitted for the NB-IoT service in the cell. In some subframe, a signal for cell search in a wireless communication system (e.g., LTE) and a signal for cell search in NB-IoT may be transmitted simultaneously (e.g., a base station may transmit the LTE PSS/SSS and the NB-IoT NPSS at the same time at the position of subframe #5). In this case, the eMTC UE may directly determine a signal to be selectively received from among the signals, or operate as indicated by the base station.

(2) Second, a case in which the cell supports the eMTC service, not the NB-IoT service.

If NB-IoT is not serviced in the cell, the base station may additionally transmit an NPSS and an NSSS in order to improve the cell search performance of the eMTC UE. To prevent other NB-IoT UEs from receiving the NPSS and the NSSS and wrongly determining that NB-IoT is serviced in the cell, the base station may need to transmit signals different from the legacy NPSS and NSSS.

As such, the base station may use the aNPSS and the aNSSS proposed in the present disclosure as the NPSS and the NSSS which are additionally transmitted to improve the cell search performance of the eMTC UE. The aNPSS and the aNSSS may be transmitted at positions different from the foregoing proposed subframe positions, and may be transmitted on a non-anchor carrier, instead of an anchor carrier. Further, the aNPSS and the aNSSS may be transmitted with an NB-IoT cell ID different from an LTE cell ID. In this case, a method of mapping between LTE cell IDs and NB-IoT cell IDs may be defined in a 3GPP technical specification.

However, if the aNPSS and the aNSSS are actually not used to serve the NB-IoT UE, the aNPSS and/or the aNSS may be transmitted without including the NRS.

The aNPSS and the aNSSS proposed in the present disclosure may be used not only for the purpose of improving the cell search performance of a narrowband system such as NB-IoT and eMTC, but also as an indication signal such as system information update The system information update may mean information (e.g., MIB and SIB) about a cell, which the UE should basically or additionally receive from the cell.

When the corresponding information is changed, the base station may generally indicate the UE to update the system information through a paging indication or a paging message. In the LTE system, it is generally indicated whether system information has been updated (or changed) by a PDCCH, an MPDCCH, or an NPDCCH scrambled with a paging-radio network temporary identifier (P-RNTI) or the like in a paging occasion.

However, this operation may not be effective in terms of power consumption of a system characterized by low cost and long battery life such as NB-IoT or eMTC. Particularly, when the UE stays in a radio resource control (RRC) IDLE state for a long time or performs discontinuous reception (DRX) for a long time in an RRC CONNECTED state, a method of providing a paging indicator based on a sequence more robust for time/frequency synchronization or information indicating whether system information update has been updated may be effective, considering previous operations such as performing time/frequency synchronization to intermittently decode a PDCCH, MPDCCH, an NPDCCH, or the like.

Considering these characteristics, the base station may partially modify an NPSS and an NSSS designed for synchronization and use the modified NPSS and NSSS as indication signals, or may use the proposed aNPSS and/or aNSSS to distinguish the aNPSS and the aNSSS from the legacy NPSS and NSSS. To reduce false alarm of detection of a paging indicator or information indicating whether system information has been updated, the cell ID and the radio frame number information of the aNPSS and/or the aNSSS may be limited to some information and used as a paging indicator.

The aNSS and aNSSS are not always transmitted at the proposed some subframe positions, but may be limited to specific positions in conjunction with a paging occasion or may be periodically or aperiodically transmitted. When the aNPSS and the aNSSS are used as a paging indicator, a UE detecting the aNPSS and the aNSSS may be configured not to update system information or perform an operation related to system information update during a specific period.

If the aNPSS and the aNSSS are used for this purpose, the aNPSS and the aNSSS transmitted from the same base station may not be the same signals or sequences each time. In other words, when used for the purpose of cell search, the aNPSS and the aNSSS need to deliver the same information (e.g., a cell ID and a radio frame number) at each transmission. However, when used as a paging indicator, the aNPSS and/or the aNSSS may deliver different information at each aNPSS and/or aNSSS transmission.

If the aNPSS and the aNSSS are used for the above purpose (as a paging indicator or to indicate system information update), the aNPSS and the aNSSS may be transmitted in consecutive DL subframes, respectively. The number of repeated transmissions of the aNSS and the aNSSS may be different from each other. For example, N aNPSS transmissions may be followed by M aNSSS transmissions in time order. N and M may be set by the base station. For example, even if N has a value greater than zero, M may be set to zero. This may cope with the case where much information is not to be used for the above purpose.

Further, a value other than 5 may be used as a root index value for the aNSSS used for the above purpose. Alternatively, two or more root indexes may be used for the aNSSS according to the amount of information required for the above purpose.

Further, a cover code other than the cover code proposed in the present disclosure may be additionally used as the cover code of the aNPSS.

When the aNPSS is repeatedly transmitted N times, the aNPSS may be repeatedly transmitted each time with a different root index and/or a different cover code and/or different resource mapping.

If the aNPSS does not provide enough information, the aNSSS may be additionally transmitted M times. The aNSSS may also be repeatedly transmitted M times with varying $\theta_f$ and/or $b_q(m)$ and/or resource mapping.

When the aNPSS is transmitted repeatedly N times with different root indexes and/or cover codes and/or resource mappings, the root indexes and/or cover codes and/or resource mappings which change during the N periods may be defined based on random sequences generated by "cell ID" and/or "the starting or ending subframes and/or radio frame and/or super frame number (SFN) of an aNPSS transmission" and/or "information about the group ID of the UE" (the group IE may be identical to the ID of a group to which the UE belongs, when UEs expecting to receive the same paging channel are grouped into the specific group) and/or "a specific value derived from a paging occasion (PO)".

Similarly, if the aNSSS is transmitted repeatedly M times with different $\theta_f$ values and/or $b_q(m)$ values and/or resource mappings, the $\theta_f$ values and/or $b_q^{(m)}$ values and/or resource mappings which change during the M periods may be defined based on random sequences generated by "cell ID" and/or "the starting or ending subframe and/or radio frame and/or super frame number (SFN) of an aNPSS transmission and/or an aNSSS transmission" and/or "information about the group ID of the UE" (the group IE may be identical to the ID of a group to which the UE belongs, when the UE is grouped into the specific group) and/or "a specific value derived from a PO.

Further, when the aNPSS and the aNSSS are repeatedly transmitted N times and M times, respectively, the methods of transmitting the aNPSS and the aNSSS with different root indexes and/or cover codes and/or resource mappings or with different $\theta_f$ values and/or $b_q(m)$ values and/or resource mappings may be defined in conjunction with each other.

The randomization may be used to acquire synchronization (at the subframe and/or radio frame and/or SFN level) of the starting transmission time and/or the ending transmission time of the aNPSS and/or the aNSSS used for the above purpose.

If a PSS structure and/or an SSS structure is used in (ef)eMTC for the same purpose (for the purpose of serving as a paging indicator or indicating system information update and for the purpose of reducing a cell search latency), the NPSS resource mapping (sequence to RE mapping) modifying method and the NSSS resource mapping (sequence to RE mapping) modifying method proposed in the present disclosure may be applied in a similar manner.

Figure 27:
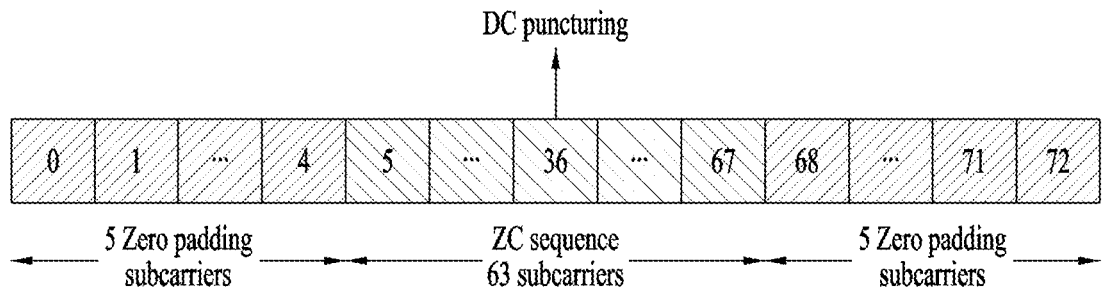
FIG. 27 is a diagram illustrating an exemplary synchronization signal applicable to the present disclosure.

FIG. 27 is a diagram illustrating an exemplary synchronization signal applicable to the present disclosure.

In FIG. 27, for example, a ZC sequence mapped to 63 carriers may be applied to a PSS in reverse order to a legacy PSS sequence. A root index unused for the legacy PSS may be used.

This modified PSS is referred to as an aPSS. Then, if the aPSS is repeatedly transmitted a plurality of times, a cover code may be additionally applied to N OFDM symbols carrying the aPSS, in a similar manner to the NPSS.

As an example of the cover code, a length-11 cover code proposed in the present disclosure may be applied. When N aPSSs are repeatedly transmitted over M subframes, different cover codes may be applied to the respective subframes. If the repeated transmissions are performed on a subframe basis, the aPSS may not always be continuously transmitted.

An SSS may also be modified for the above purposes. For the convenience of description, the SSS modified for the above purpose will be referred to as an aSSS.

For the legacy SSS, two M-sequence RE mappings are interleaved in different orders for two transmissions of the SSS in a radio frame. For the aSSS, resources may be mapped on the frequency axis in reserve order for both SSSs. Alternatively, the resource mapping of the aSSS may amount to circularly shifting the resource mapping of the SSS by some REs on the frequency axis.

An aSSS including one OFDM symbol may also be repeated over N' OFDM symbols. Like the aPSS, a cover code may be applied to each of the OFDM symbols.

In addition, the circular shift value of the aSSS repeatedly transmitted N' times may not be a fixed value. The aSSS that is repeated N' times may be repeatedly transmitted during M' subframes, and the circular shift value of the cover code and/or the resource mapping may be different between aSSS subframes repeatedly transmitted, like the aPSS.

If a root index and/or a cover code and/or resource mapping changes during N repeated transmissions of the PSS, the root index and/or the cover code and/or the resource mapping which changes during the N periods may be defined based on a random sequence generated by "cell ID" and/or "the starting or ending subframe and/or radio frame and/or SFN of a PSS transmission" and/or "information about the group ID of the UE" (the group IE may be identical to the ID of a group to which the UE belongs, when UEs expecting to receive the same paging channel are grouped into the specific group) and/or "a specific value derived from a PO".

If the SSS is transmitted repeatedly M times in different interleaving orders and/or by different resource mappings, the interleaving order and/or resource mapping which changes during the M periods may be defined based on a random sequence generated by "cell ID" and/or "the starting or ending subframe and/or radio frame and/or SFN of a PSS transmission and/or an SSS transmission" and/or "information about the group ID of the UE" (the group IE may be identical to the ID of a group to which the UE belongs, when UEs expecting to receive the same paging channel are grouped into the specific group) and/or "a specific value derived from a PO".

Further, when the PSS and the SSS are repeatedly transmitted N times and M times, respectively, the methods of transmitting the PSS and the SSS with different root indexes and/or cover codes and/or resource mappings or with different interleaving orders and/or resource mappings may be defined in conjunction with each other. The randomization may be used to acquire synchronization (at the subframe and/or radio frame and/or SFN level) of the starting transmission time and/or the ending transmission time of the aNPSS and/or the aNSSS used for the above purpose.

In all of the proposed techniques, a method of changing a RE mapping or resource mapping order may include additionally interleaving a corresponding sequence prior to resource mapping and then mapping the interleaved sequence to resources in a legacy resource mapping method.

For example, although a sequence is mapped to resources according to the legacy method, an interleaving step is added before the resource mapping, thereby achieving the effect of changing a resource mapping method. A specific interleaving method may be determined based on a pseudo random sequence generated by "cell ID" and/or "the starting or ending subframe and/or radio frame and/or SFN of a PSS transmission and/or an SSS transmission" and/or "information about the group ID of the UE" (the group IE may be identical to the ID of a group to which the UE belongs, when UEs expecting to receive the same paging channel are grouped into the specific group) and/or "a specific value derived from a PO".

The aNPSS and aNSSS proposed in the present disclosure may be used to distinguish between TDD and FDD. The aNPSS and aNSSS may be transmitted at positions different from the subframe positions described before in proposal 1 and proposal 2.

Further, when the aNPSS and the aNSSS are used as synchronization signals in a TDD system, the root u and/or cover code of the aNPSS may be used to identify a UL-DL configuration. For example, the cover code may be used to identify a duplex mode, and the root u may be used to identify a UL-DL configuration.

If there are too small a number of roots u and/or cover code types to distinguish all UL-DL configurations from each other, or if it is expected that the use of roots u and/or cover code types enough to distinguish all UL-DL configurations from each other will lead to performance degradation, roots u and/or cover code types enough to distinguish only some of the UL-DL configurations from each other may be used.

That is, if the relative positions of the (a)NPSS and the (a)NSSS may change according to a UL-DL configuration, the (a)NPSS may only have to deliver information which identifies the relative position relationship with the (a)NSSS.

The UE may obtain an actual UL-DL configuration from an MIB-NB or SIB for TDD after detecting the (a)NPSS and (a)NSSS.

Figure 28:
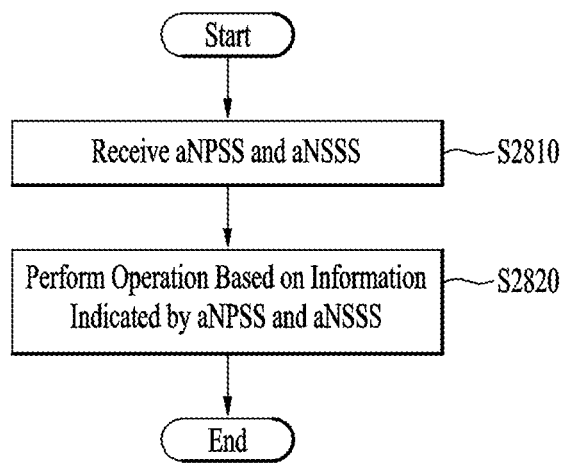
FIG. 28 is a flowchart illustrating an operation of a UE according to the present disclosure.

FIG. 28 is a flowchart illustrating an operation of a UE according to the present disclosure.

A description will be given of a specific operation of a UE using a new NPSS (referred to as an aNPSS) and a new NSSS (referred to as aNSSS) which have structures similar to those of an NPSS and an NSSS defined in a wireless communication system supporting NB-IoT.

The UE may first receive an aNPSS and an aNSSS from a base station (S2810).

The new NPSS may be generated by applying the root index and cover code of a Zadoff-Chu sequence, at least one of which is different from that of an NPSS sequence defined in the wireless communication system supporting NB-IoT. Further, the new NSS may be generated by a parameter, a binary sequence, and a resource mapping method applied to a Zadoff-Chu sequence, at least one of which is different from that of an NSSS sequence defined in the wireless communication system supporting NB-IoT.

For example, 6 as the root index of the Zadoff-Chu sequence may be applied to the new NPSS.

In another example, [1, 1, −1, 1, −1, −1, 1, −1, 1, −1, 1] may be applied to the new NPSS, as a cover code of the Zadoff-Chu sequence.

For example, one of {33/264, 99/264, 165/264, 231/264} may be applied to the new NSSS, as the parameter, $\theta_f$ applied to the Zadoff-Chu sequence.

In another example, for the new NSSS, a binary sequence may be used, to which the values of $16^{th}$, $48^{th}$, $80^{th}$, and $112^{th}$ columns of a Hadamard matrix of order 128 used for the NSSS defined in the NB-IoT system are applied, instead of the values of $1^{st}$, $32^{nd}$, $64^{th}$, and $128^{th}$ columns of the Hadamard matrix.

In another example, a time-first resource mapping method may be applied to a sequence of the new NSSS.

The new NPSS and the new NSSS generated in this manner may be received as follows.

For example, the new NPSS and the new NSSS may be received on an anchor carrier. The new NPSS may be received in the next subframe to a subframe carrying an NPSS, and the new NSSS may be received apart from the NSSS by 10 subframes.

In another example, the new NPSS and the new NSSS may be received on an anchor carrier. The new NPSS and the new NSSS may be received alternately, apart from the NSSS by 10 subframes.

In another example, the new NPSS and the new NSSS may be received on a non-anchor carrier. The new NPSS may be received in the first subframe of every radio frame, and the new NSSS may be received in the fifth subframes of one or more odd-numbered or even-numbered radio frames.

In another example, the new NPSS and the new NSSS may be received on a non-anchor carrier. The new NPSS and the new NSSS may be alternately received in the first subframes of all radio frames.

In the present disclosure, the new NPSS and the new NSSS may not include an NRS.

Then, the UE performs at least one of cell search, acquisition of information indicating whether paging is transmitted and system information has been updated, or acquisition of information about a duplex mode applied to the wireless communication system, based on information indicated by at least one of the new NPSS or the new NSSS (S2820).

For example, the UE may perform the cell search by accumulatively detecting the new NPSS and the new NSSS.

In another example, if the new NPSS and the new NSSS are used to indicate paging transmission and update or non-update of system information, the new NPSS may be repeatedly transmitted in N consecutive subframes, followed by repeated transmissions of the new NSSS in M consecutive subframes. A different cover code may be applied on a subframe basis to the new NPSS transmitted repeatedly in the N subframes, and at least one of a cover code or a resource mapping method may be different on a subframe basis for the new NSSS transmitted repeatedly in the M subframes. N is an integer equal to or larger than 0, and M may be a natural number.

Accordingly, when the new NPSS and the new NSSS indicate that the system information has been updated, the UE may update the system information.

In the above configuration, the new NPSS and the new NSSS may be transmitted at any positions, not limited to specific subframe positions (e.g., subframes corresponding to specific subframe indexes), and can be transmitted at an arbitrary position.

The new NPSS and the new NSSS may be repeatedly transmitted in one or more subframes. A (different) cover code, (different) resource mapping, root index, thethat_f, or the like may be applied to each of the new NPSS and the new NPSSS on a subframe basis.

In the case where the new NPSS/NSSS is used for the purpose of indicating paging transmission and update or non-update of system information as described before, only the new NSSS may be transmitted without transmitting the new NPSS.

In another example, the UE may determine that a duplex mode applied to the wireless communication system is a TDD or FDD mode based on the root index of the Zadoff-Chu sequence applied to the new NPSS.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by a base station.

5. Device Configuration

Figure 29:
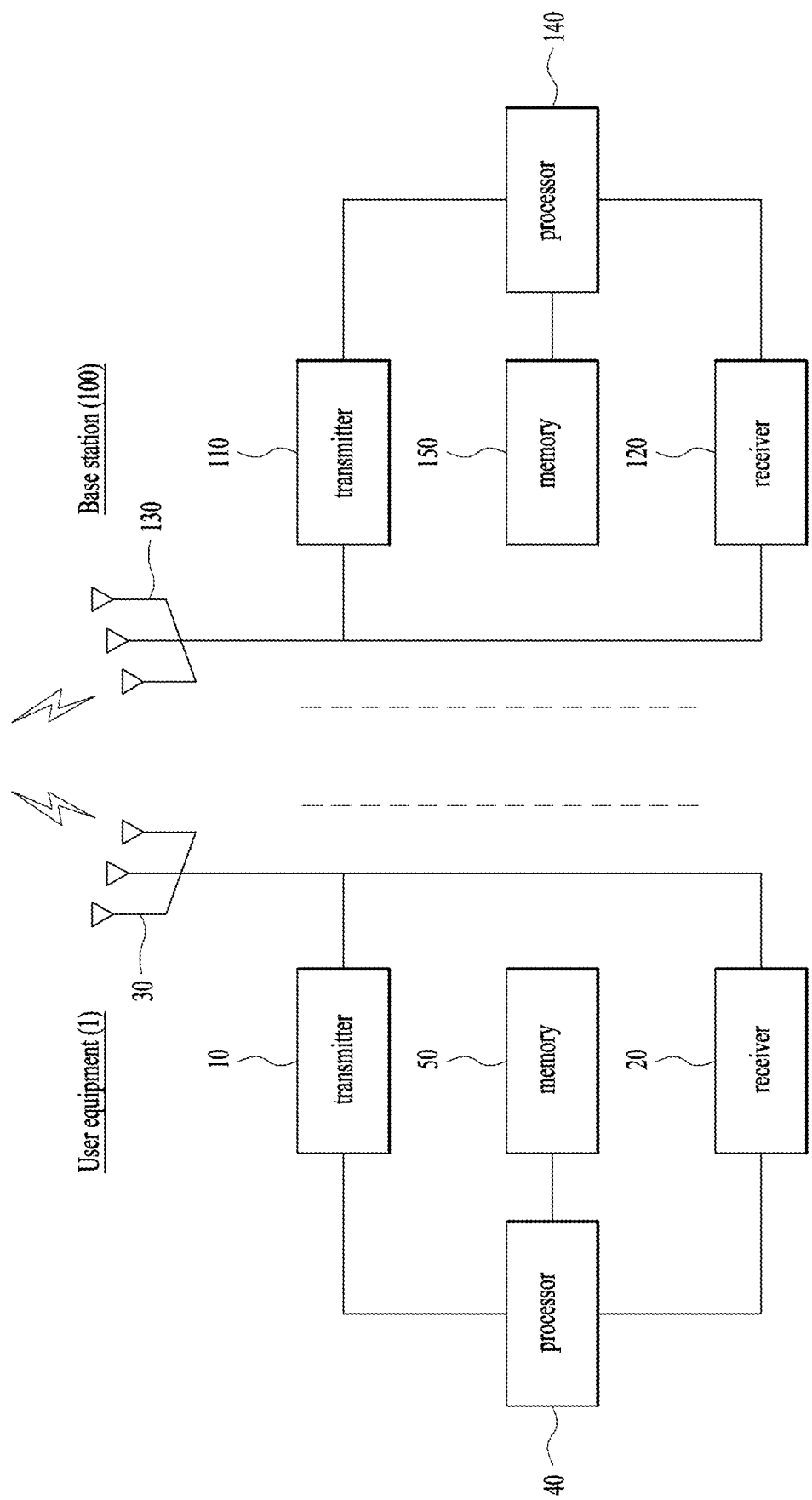
FIG. 29 is a diagram illustrating the configurations of a UE and a base station (BS) which may implement the proposed embodiments.

FIG. 29 is a diagram illustrating configurations of a UE and a BS for implementing the proposed embodiments. The UE and the BS illustrated in FIG. 29 operate to implement the above-described embodiments of the foregoing UE operation methods and the BS operation methods corresponding to the UE operation methods.

A UE 1 may act as a transmitter on a UL and as a receiver on a DL. A BS (eNB or gNB) 100 may act as a receiver on a UL and as a transmitter on a DL.

That is, each of the UE and the BS may include a transmitter (Tx) 10 or 110 and a receiver (Rx) 20 or 120, for controlling transmission and reception of information, data, and/or messages, and an antenna 30 or 130 for transmitting and receiving information, data, and/or messages.

Each of the UE and the BS may further include a processor 40 or 140 for implementing the afore-described embodiments of the present disclosure and a memory 50 or 150 for temporarily or permanently storing operations of the processor 40 or 140.

The UE 1 configured as described above receives a new NPSS and a new NSSS through the Rx 20. Then, the UE 1 performs one or more of cell search, acquisition of information indicating whether paging is transmitted system information has been updated, and acquisition of information about a duplex mode applied to the wireless communication system, based on information indicated by one or both of the new NPSS and the new NSSS through the processor 40.

The new NPSS may be generated by applying a root index and a cover code to a Zadoff-Chu sequence, one or both of which are different from those of an NPSS sequence defined in a wireless communication system supporting NB-IoT. Further, the new NSSS may be generated by applying a parameter, a binary sequence, and a resource mapping method to a Zadoff-Chu sequence, one or more of which are different from those of an NSSS sequence defined in the wireless communication system supporting NB-IoT.

The Tx and Rx of the UE and the BS may perform a packet modulation/demodulation function for data transmission, a high-speed packet channel coding function, OFDMA packet scheduling, TDD packet scheduling, and/or channelization. Each of the UE and the BS of FIG. 29 may further include a low-power radio frequency (RF)/intermediate frequency (IF) module.

Meanwhile, the UE may be any of a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smart phone, a multi mode-multi band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method may also be applied to mmWave communication using an ultra-high frequency band.

The invention claimed is:

1. A method for operating a user equipment (UE) in a wireless communication system, the method comprising:
receiving i) a narrowband primary synchronization signal (NPSS) based on a first Zadoff-Chu sequence and ii) a narrowband secondary synchronization signal (NSSS) based on a second Zadoff-Chu sequence;
receiving an additional NPPS and an additional NSSS,
wherein the additional NPSS is generated by changing at least one of a root index or a cover code applied to the first Zadoff-Chu sequence, and
wherein the additional NSSS is generated by changing at least one of a parameter about cyclic shift applied to the second Zadoff-Chu Sequence, a binary sequence, or a resource mapping method applied to the second Zadoff-Chu sequence; and
based on at least one of the additional NPSS or the additional NSSS, performing at least one of cell search or acquisition of information about whether a paging message is transmitted and system information has been updated,
wherein the resource mapping method is changed by changing at least one of a location or an order of resources to which the second Zadoff-Chu sequence is mapped.

2. The method of claim 1, wherein the additional NPSS and the additional NSSS are received via an anchor carrier, and wherein the additional NPSS is received in a subframe following a subframe carrying the NPSS, and
wherein the additional NSSS is received apart from the NSSS by 10 subframes.

3. The method of claim 1,
wherein the additional NPSS and the additional NSSS are received via an anchor carrier, and
wherein the additional NPSS and the additional NSSS are received alternately, apart from the NSSS by 10 subframes.

4. The method of claim 1,
wherein the additional NPSS and the additional NSSS are received via a non-anchor carrier, and
wherein the additional NPSS is received in a first subframe of every radio frame, and
wherein the additional NSSS is received in a fifth subframe of at least one of odd-numbered or even-numbered radio frames.

5. The method of claim 1,
wherein the additional NPSS and the additional NSSS are received via a non-anchor carrier, and
wherein the additional NPSS and the additional NSSS are received alternately in a first subframe of every radio frame.

6. The method of claim 1,
wherein the additional NPSS and the additional NSSS do not include a narrowband reference signal.

7. The method of claim 1,
wherein the UE performs the cell search by accumulatively detecting the additional NPSS and the additional NSSS.

8. The method of claim 1,
wherein, based on the additional NPSS and the additional NSSS used for indicating whether the paging message is transmitted and the system information has been updated:
the additional NSSS is repeatedly transmitted in M consecutive subframes after the additional NPSS is repeatedly transmitted in N consecutive subframes,
the additional NPSS is transmitted by applying a different cover codes per subframe,
the additional NSSS is transmitted by applying at least one of a different cover code per subframe or a different resource mapping method per subframe,
N is an integer equal to or larger than 0, and M is a natural number.

9. The method of claim 8,
wherein based on the additional NPSS and the additional NSSS used for indicating that the system information has been updated, the UE updates the system information based on the additional NPSS and the additional NSSS.

10. The method of claim 1,
wherein the UE determines a duplex mode applied to the wireless communication system as a time division duplex, TDD, or a frequency division duplex, FDD, based on a root index applied to the additional NPSS.

11. The method of claim 1,
wherein the root index applied to the NPSS is 5, and a root index applied to the additional NPSS is 6.

12. The method of claim 1,
wherein the cover code applied to the NPSS is [1, 1, 1, 1, −1, −1, 1, 1, 1, −1, 1]) and a cover code applied to the additional NPSS is [1, 1, −1, 1, −1, −1, 1, −1, 1, −1, 1].

13. The method of claim 1,
wherein the parameter $\theta_f$ applied to the NSSS is one of $\{0, 33/132, 66/132, 99/132\}$ and a parameter $\theta_f$ applied to the additional NSSS is one of $\{33/264, 99/264, 165/264, 231/264\}$.

14. The method of claim 1,
wherein the binary sequence applied to the NSSS is values of $1^{st}$, $32^{th}$, $64^{th}$, and $128^{th}$ columns of a Hadamard matrix of order 128, and a binary sequence applied to the additional NSSS is values of columns $16^{th}$, $48^{th}$, $80^{th}$, and $112^{th}$ the Hadamard matrix of order 128.

15. The method of claim 1,
wherein a resource mapping method applied to the additional NSSS is time-first resource mapping.

16. A user equipment UE configured to operate based on a signal received from a base station in a wireless communication system, the UE comprising:
a receiver; and
a processor operatively coupled to the receiver,
wherein the processor is configured to:
receive i) a narrowband primary synchronization signal, NPSS, based on a first Zadoff-Chu sequence and ii) a narrowband secondary synchronization signal, NSSS, based on a second Zadoff-Chu sequence;
receive an additional NPSS and an additional NSSS,
wherein the additional NPSS is generated by changing at least one of a root index or a cover code applied to the first Zadoff-Chu sequence, and
wherein the additional NSSS is generated by changing at least one of a parameter about cyclic shift applied to the second Zadoff-Chu Sequence, a binary sequence, or a resource mapping method applied to the second Zadoff-Chu sequence; and
based on at least one of the additional NPSS or the additional NSSS, perform at least one of cell search or acquisition of information about whether a paging message is transmitted and system information has been updated, and
wherein the resource mapping method is changed by changing at least one of a location or an order of resources to which the second Zadoff-Chu sequence is mapped.

17. The UE of claim 16, wherein the UE communicates with at least one of a mobile terminal, a network and an autonomous vehicle.

* * * * *